United States Patent
Calhoun et al.

(10) Patent No.: US 9,812,965 B2
(45) Date of Patent: Nov. 7, 2017

(54) LOW INPUT VOLTAGE BOOST CONVERTER WITH PEAK INDUCTOR CURRENT CONTROL AND OFFSET COMPENSATED ZERO DETECTION

(71) Applicant: University of Virginia Patent Foundation, Charlottesville, VA (US)

(72) Inventors: Benton Calhoun, Charlottesville, VA (US); Aatmesh Shrivastava, Charlottesville, VA (US)

(73) Assignee: University of Virginia Patent Foundation, Charlottesville, VA (US)

(*) Notice: Subject to any disclaimer, the term of this patent is extended or adjusted under 35 U.S.C. 154(b) by 0 days.

(21) Appl. No.: 15/382,639

(22) Filed: Dec. 17, 2016

(65) Prior Publication Data

US 2017/0098999 A1    Apr. 6, 2017

Related U.S. Application Data

(62) Division of application No. 15/268,783, filed on Sep. 19, 2016, which is a division of application No.
(Continued)

(51) Int. Cl.
*H02M 3/156* (2006.01)
*H02M 3/158* (2006.01)
(Continued)

(52) U.S. Cl.
CPC .......... *H02M 3/158* (2013.01); *H02M 1/088* (2013.01); *H02M 2001/0025* (2013.01)

(58) Field of Classification Search
CPC ...... H02M 1/083; H02M 1/088; H02M 3/156; H02M 3/1588
(Continued)

(56) References Cited

U.S. PATENT DOCUMENTS

| 4,672,303 A | 6/1987 | Newton |
| 5,703,473 A * | 12/1997 | Phillips .................. G05F 1/565 |
| | | 323/282 |

(Continued)

OTHER PUBLICATIONS

PCT International Search Report and Written Opinion in corresponding PCT/US2015/012024 dated Apr. 28, 2015. (Cited in parent U.S. Appl. No. 14/600,425, filed Jan. 20, 2015.).
(Continued)

*Primary Examiner* — Jeffrey Sterrett
(74) *Attorney, Agent, or Firm* — Westerman, Hattori, Daniels & Adrian, LLP

(57) ABSTRACT

The low input voltage boost converter with peak inductor current control and offset compensated zero detection provide a boost converter scheme to harvest energy from sources with small output voltages. Some embodiments described herein includes a thermoelectric boost converter that combines an $I_{PEAK}$ control scheme with offset compensation and duty cycled comparators to enable energy harvesting from TEG inputs as low as 5 mV to 10 mV, and the peak inductor current is independent to first order of the input voltage and output voltage. A control circuit can be configured to sample the input voltage ($V_{IN}$) and then generate a pulse with a duration inversely proportional to $V_{IN}$ so as to control the boost converter switches such that a substantially constant peak inductor current is generated.

20 Claims, 19 Drawing Sheets

Related U.S. Application Data

15/085,428, filed on Mar. 30, 2016, now Pat. No. 9,490,698, which is a division of application No. 14/600,425, filed on Jan. 20, 2015, now Pat. No. 9,325,240.

(60) Provisional application No. 61/928,621, filed on Jan. 17, 2014.

(51) Int. Cl.
*H02M 1/088* (2006.01)
*H02M 1/00* (2006.01)

(58) Field of Classification Search
USPC .......................................... 323/222, 271, 282
See application file for complete search history.

(56) References Cited

U.S. PATENT DOCUMENTS

| | | |
|---|---|---|
| 5,757,635 A | 5/1998 | Seong |
| 5,959,852 A | 9/1999 | Deloy et al. |
| 6,222,746 B1 | 4/2001 | Kim |
| 6,597,157 B1 | 7/2003 | Boeckmann et al. |
| 7,064,527 B2 | 6/2006 | Adragna |
| 7,514,912 B2 | 4/2009 | Shao |
| 8,026,704 B2 | 9/2011 | Kapels et al. |
| 8,823,346 B2 | 9/2014 | Walters |
| 9,325,240 B2 | 4/2016 | Calhoun |
| 9,450,492 B1 * | 9/2016 | Bizjak .................. H02M 3/156 |
| 2005/0242788 A1 | 11/2005 | Reithmaier |
| 2005/0253565 A1 | 11/2005 | Cohen |
| 2006/0043942 A1 * | 3/2006 | Cohen .................. H02M 3/156 323/207 |
| 2010/0208498 A1 | 8/2010 | Rubio et al. |
| 2011/0109283 A1 | 5/2011 | Kapels et al. |
| 2013/0106194 A1 | 5/2013 | Jergovic et al. |
| 2013/0141067 A1 | 6/2013 | Huang et al. |
| 2013/0265023 A1 | 10/2013 | Schwartz |
| 2014/0347028 A1 | 11/2014 | Jayaraj et al. |
| 2015/0207411 A1 * | 7/2015 | Calhoun ............... H02M 1/088 323/235 |
| 2017/0098999 A1 * | 4/2017 | Calhoun ............... H02M 3/158 |

OTHER PUBLICATIONS

Office Action dated Aug. 21, 2017 in corresponding Chinese Application No. 201580004892.5 (w/machine translation)(Listed references were previously disclosed in prior IDS).

* cited by examiner

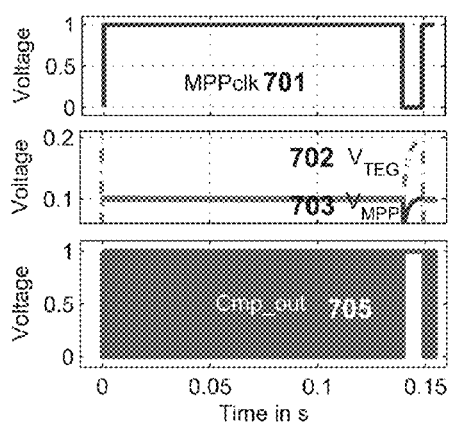
Fig. 7 Simulation result of MPP tracking
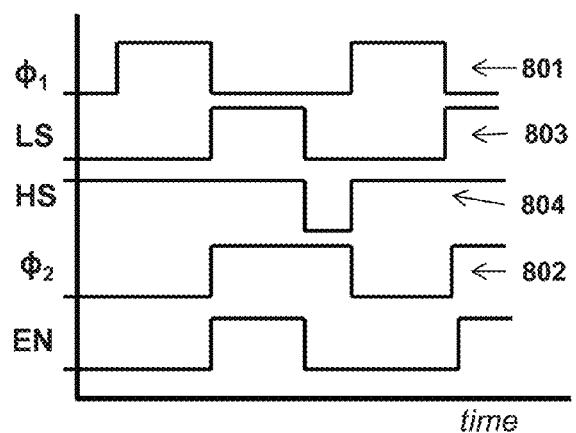
Fig. 8 Boost control Timing Signals
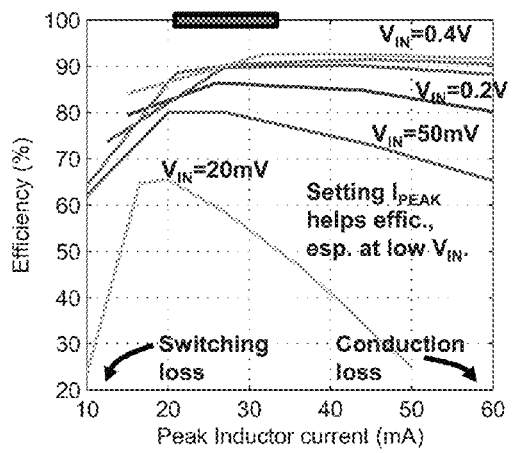
Fig. 9 Efficiency variation with peak $I_L$

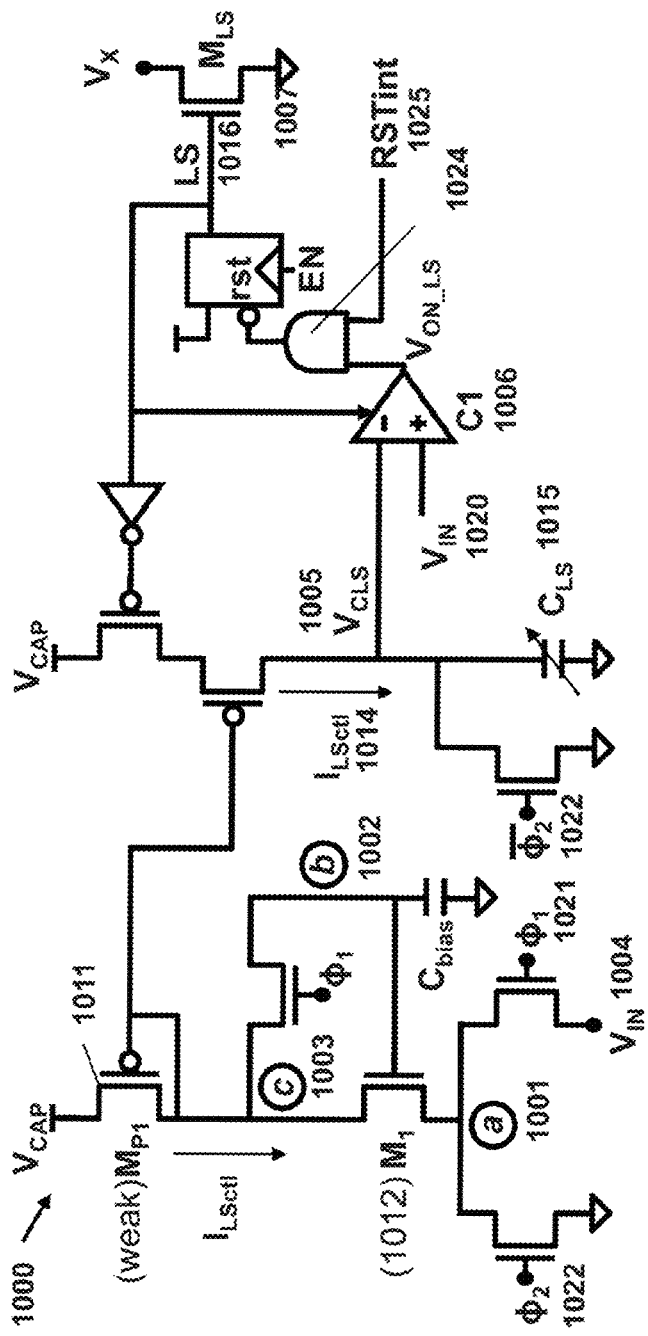
Fig. 10: The Low Side (LS) timing circuit sets $I_{PEAK}$ independently from $V_{IN}$ or $V_{CAP}$.
| Phase | Node ⓐ | Node ⓑ | $I_{LSctl}$ |
|---|---|---|---|
| $\phi_1$ | $V_{IN}$ | $V_{IN}+V_{TM1}$ | - |
| $\phi_2$ | - | $V_{IN}+V_{TM1}$ | $\alpha\,(V_{IN}+V_{TM1}-V_{TM1})^2$<br>$\alpha\,(V_{IN})^2$ |

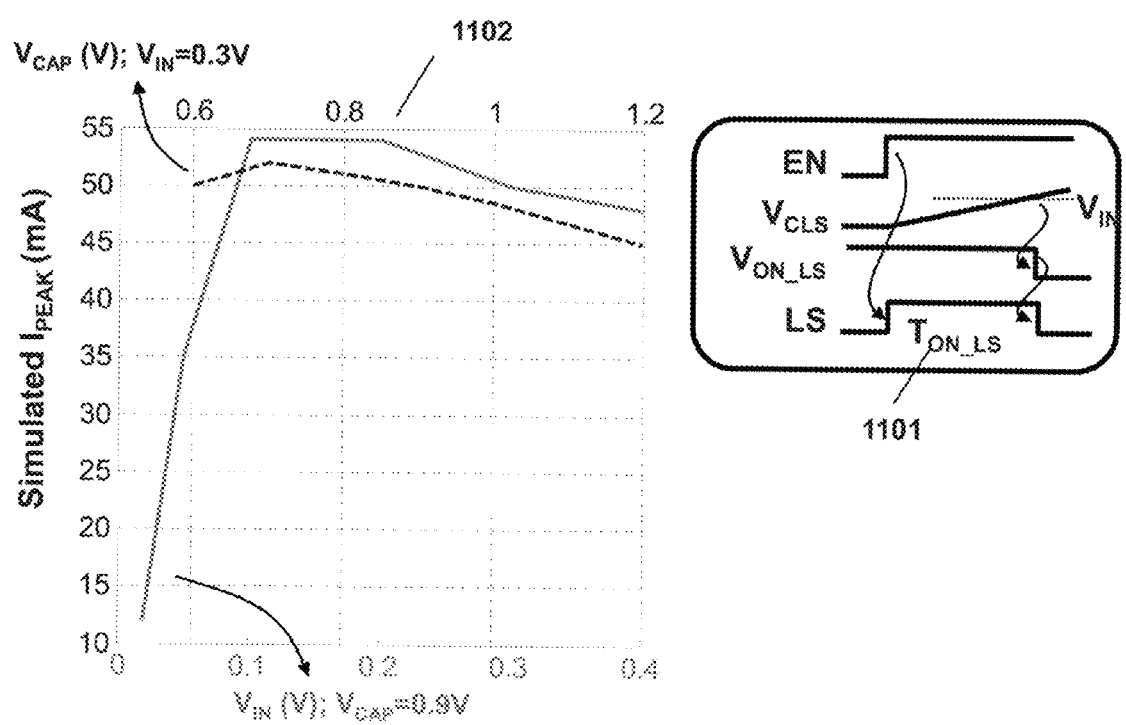
Fig. 11 Simulated Inductor Current

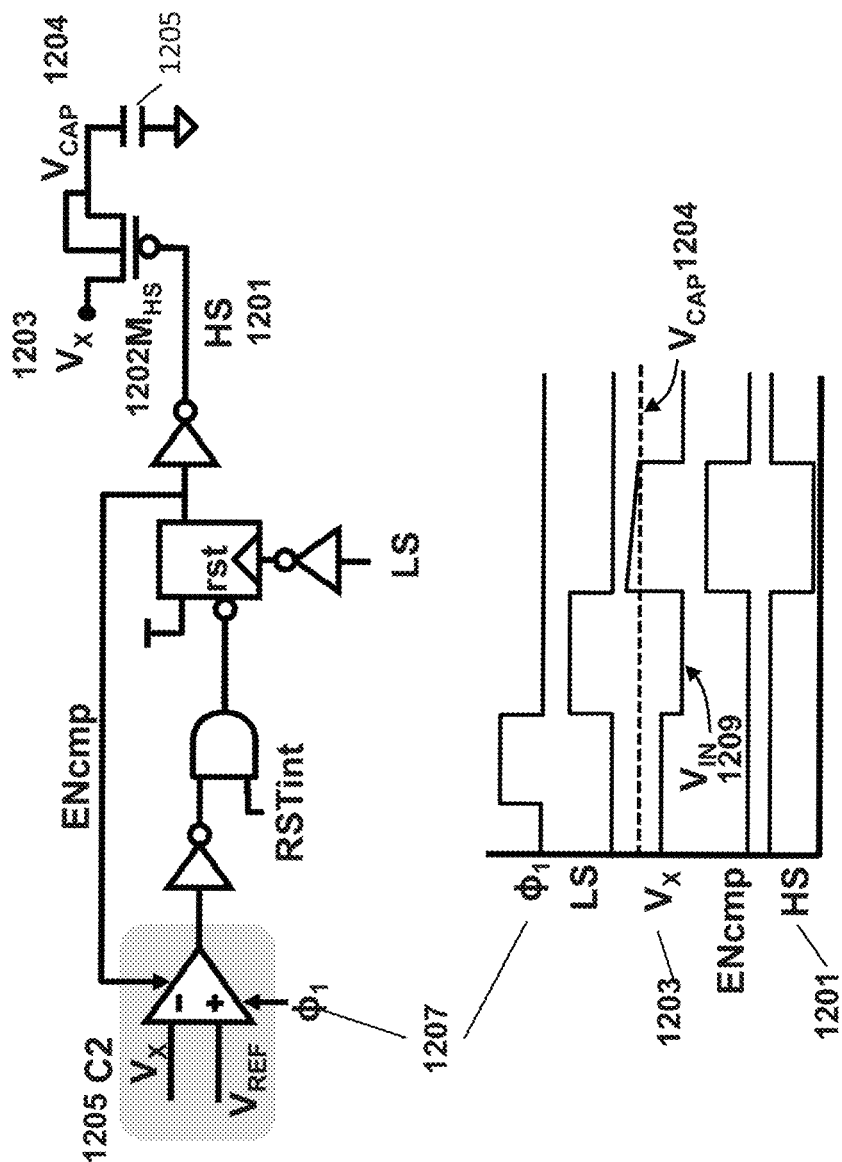
Fig. 12: High Side (HS) timing circuit

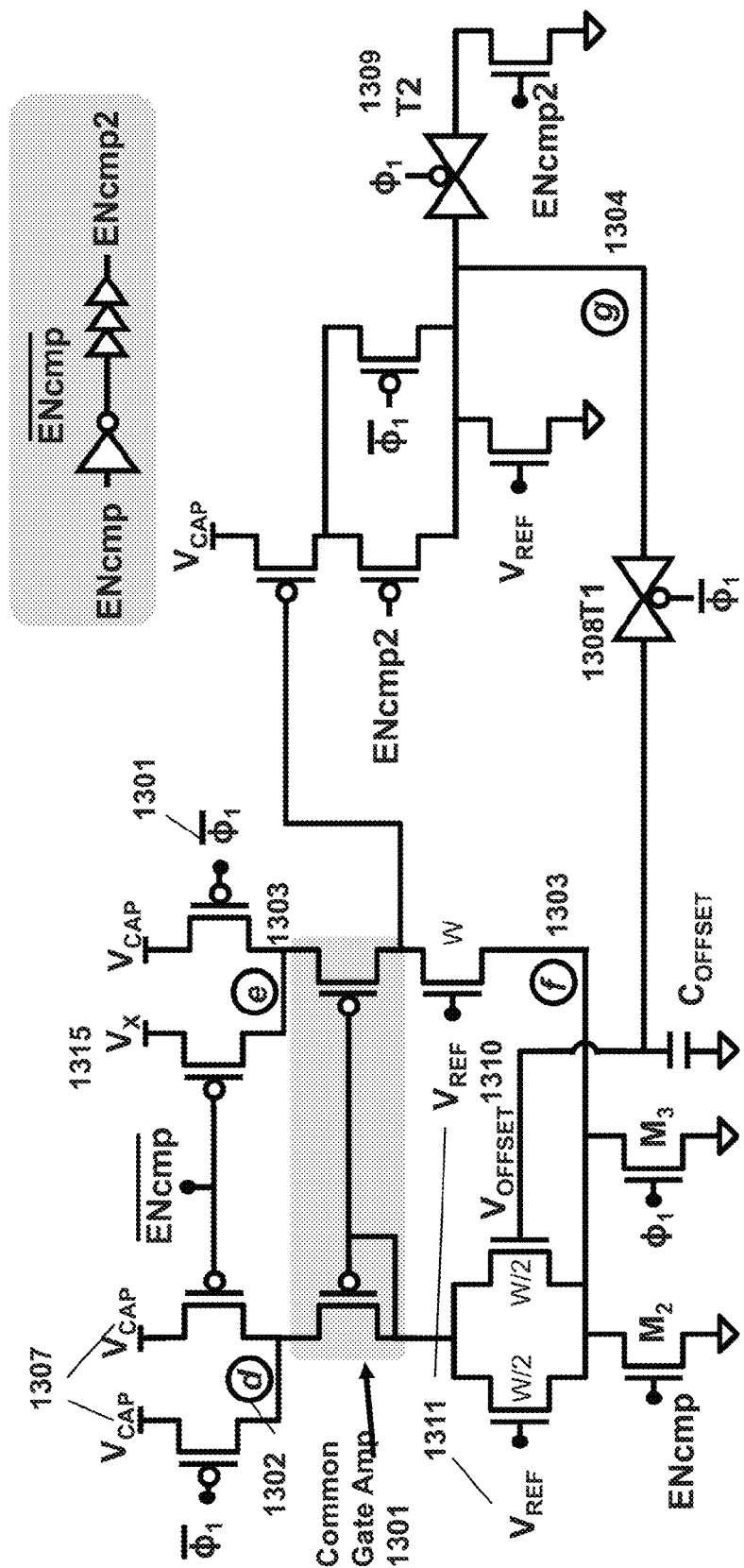
Fig. 13 Offset-compensated (for offset <1mV) and duty cycled (for low power) comparator

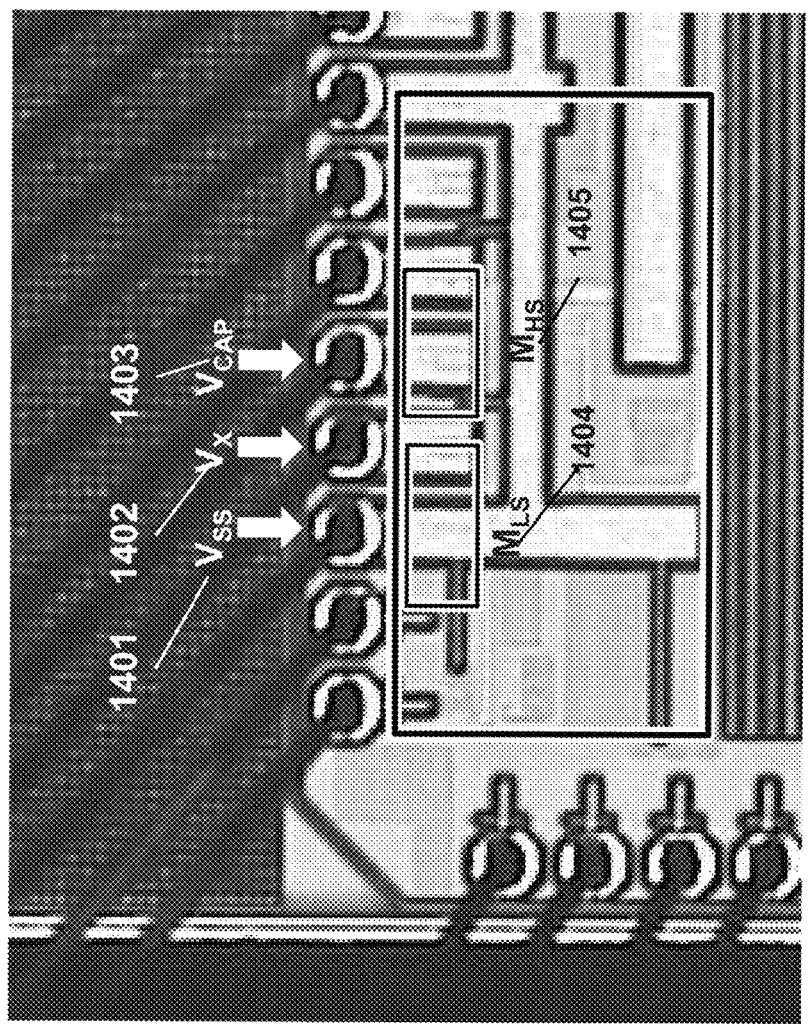
| Parameter | Value |
|---|---|
| Technology | 130nm bulk CMOS |
| Total area | 600 μm x 200 μm |
| Inductor value, L | 10 μH |
| Designed $V_{IN}$-to-$V_{SS}$ $M_{LS}$ resistance | 300 mΩ (Target) |
| Inductor DCR | 70 mΩ |
| Bondwire | 50 mΩ (1mm,1mil,gold) |
| NMOS Res | 120 mΩ |
| Layout parasitic | 60 mΩ |
Fig. 14: Die photograph of the boost converter.

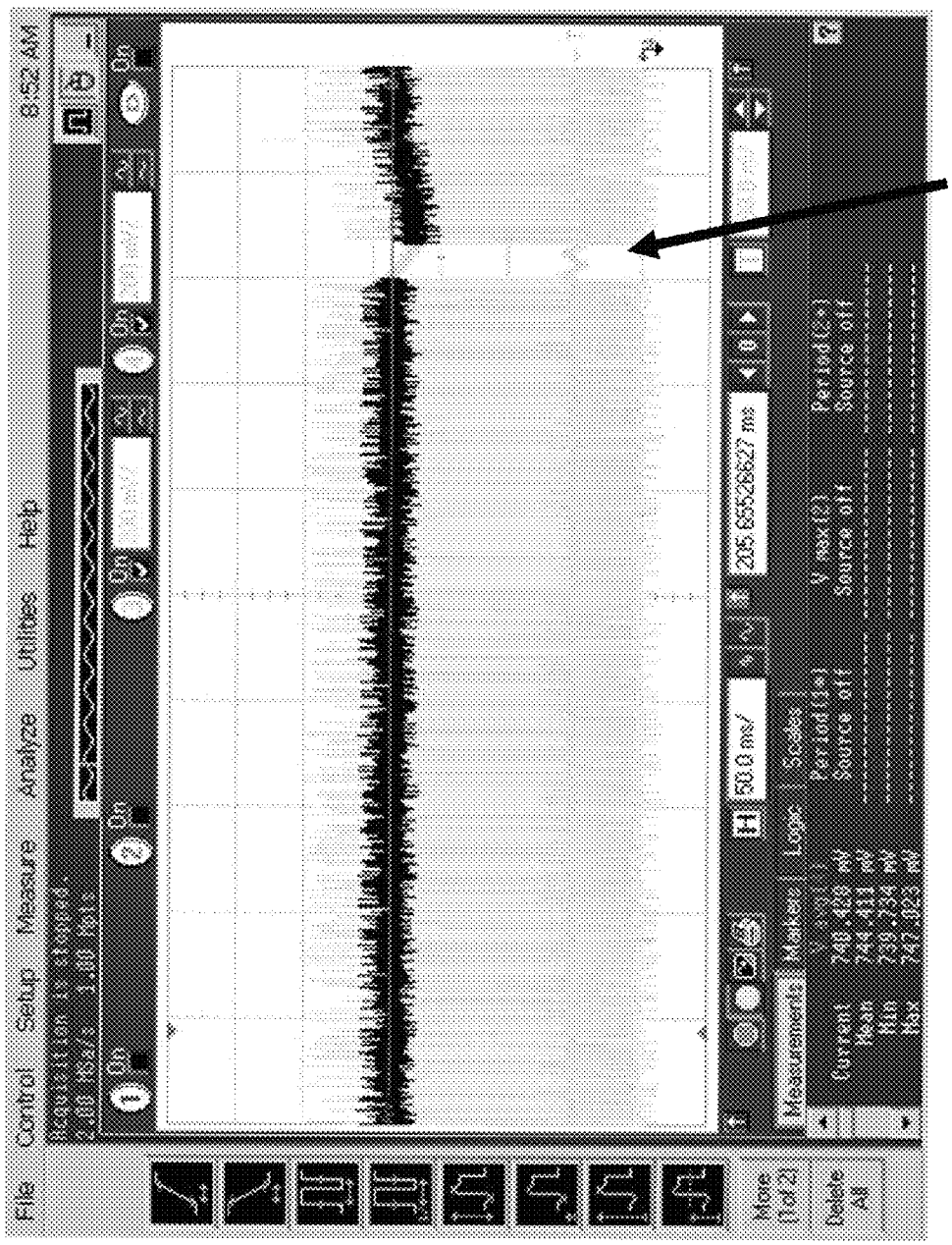
Fig. 15: Measured output for MPP Tracking showing correct operation and recalibration.

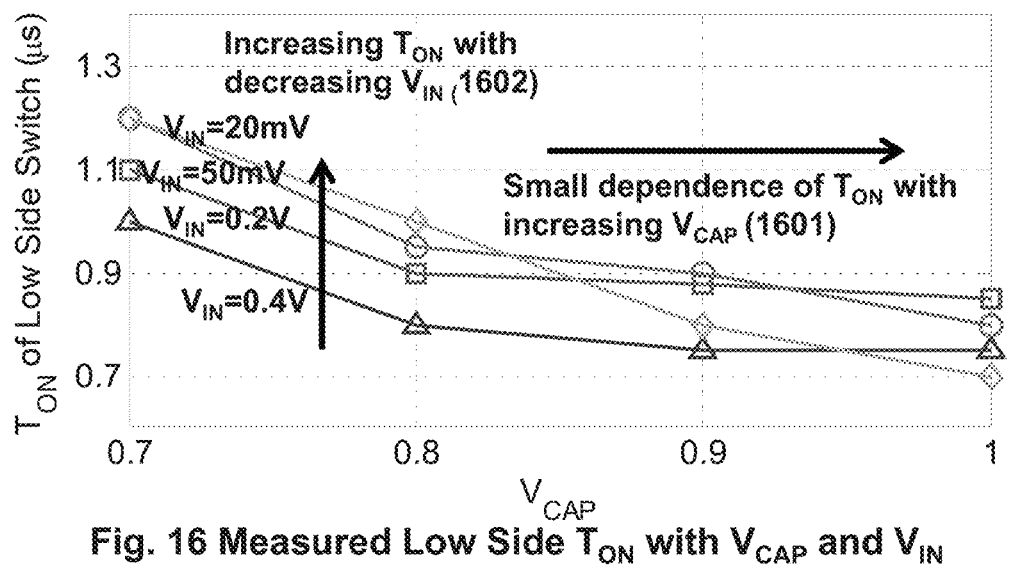
Fig. 16 Measured Low Side $T_{ON}$ with $V_{CAP}$ and $V_{IN}$

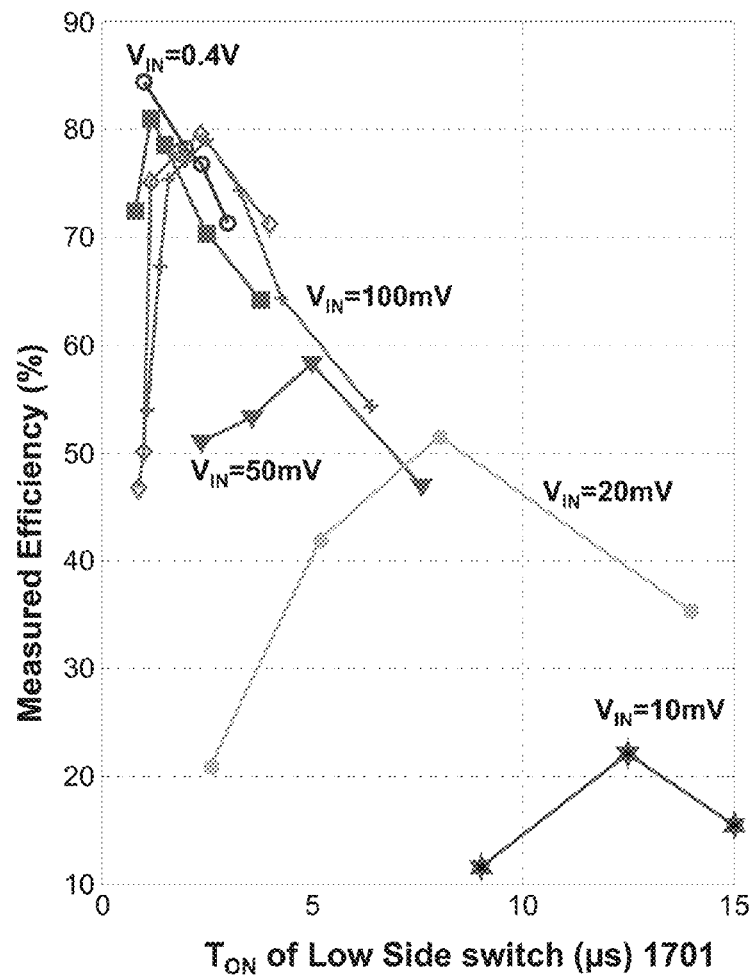
Fig. 17 Measured efficiency with Low Side $T_{ON}$, showing increased efficiency at Higher $T_{ON}$ for Low $V_{IN}$

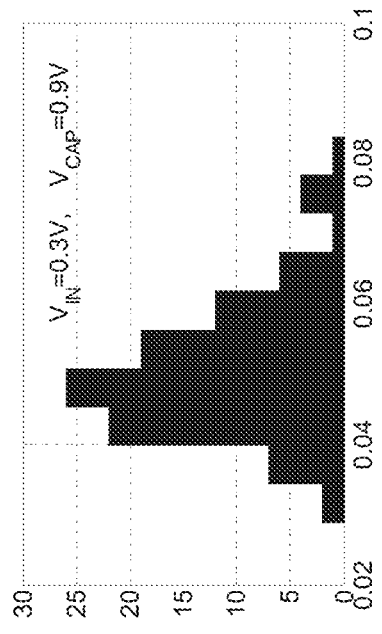
Fig. 18 Variation of peak inductor current with process using Monte-Carlo simulation
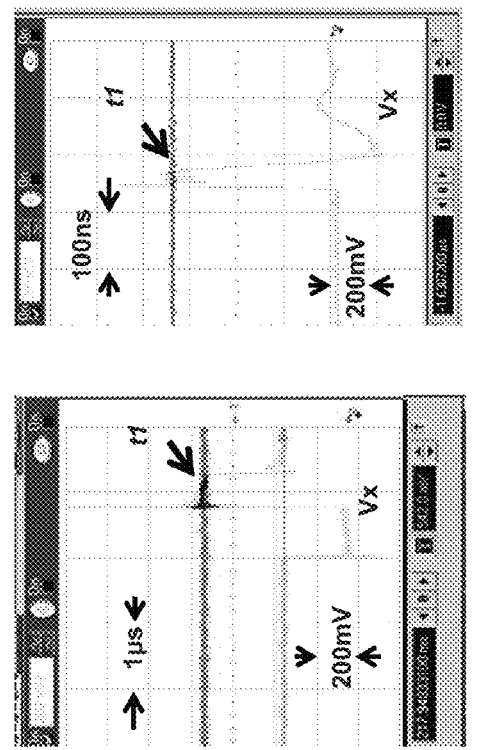
Fig. 19 Measured Zero-detection scheme showing optimal zero detection for ratio up to 47X

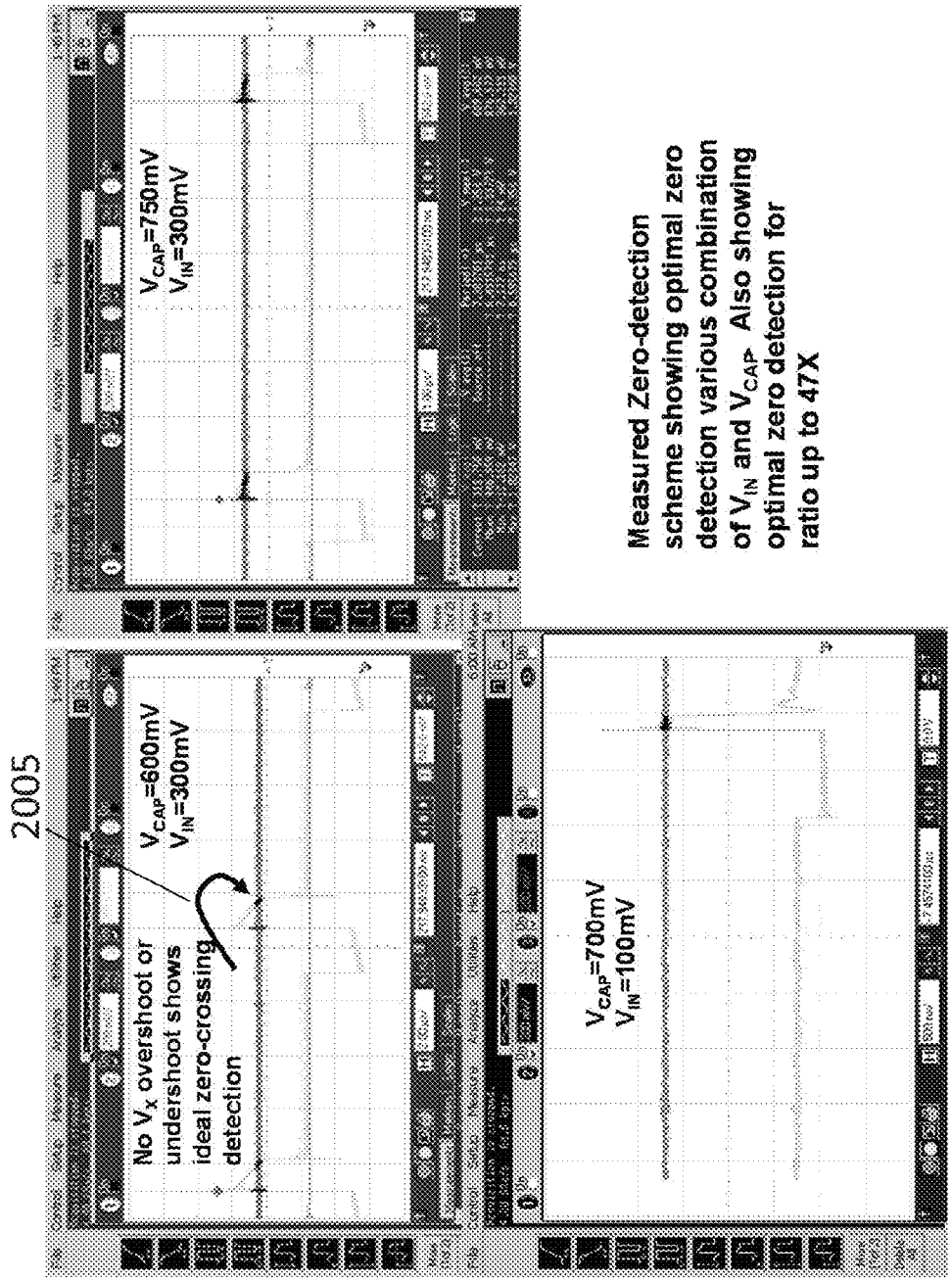
Fig. 20 Measured Zero-detection scheme showing optimal zero detection for ratio up to 47X

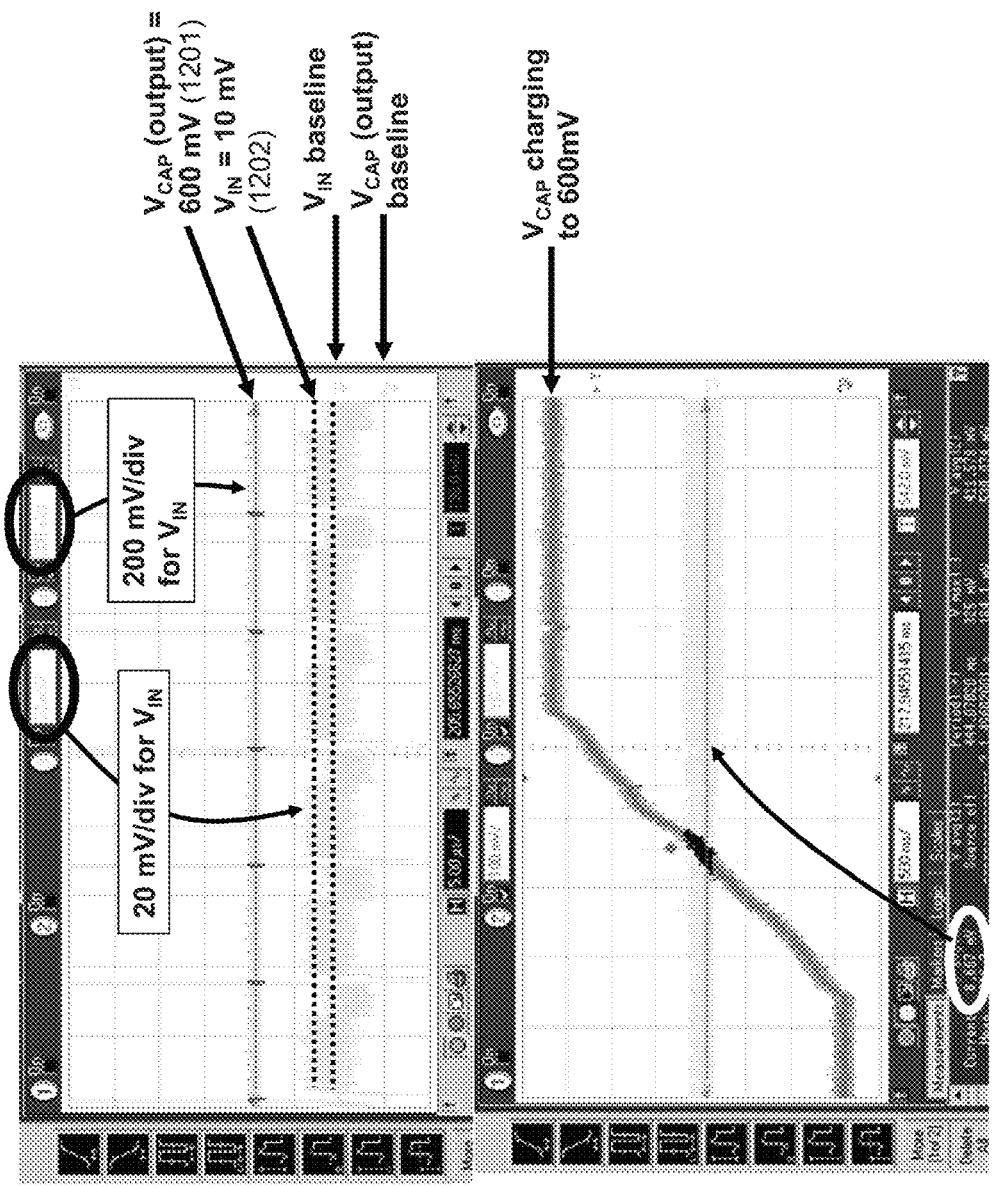
Fig. 21: Measured operation of the boost converter with $V_{IN}$=10mV and $V_{IN}$=8mV.

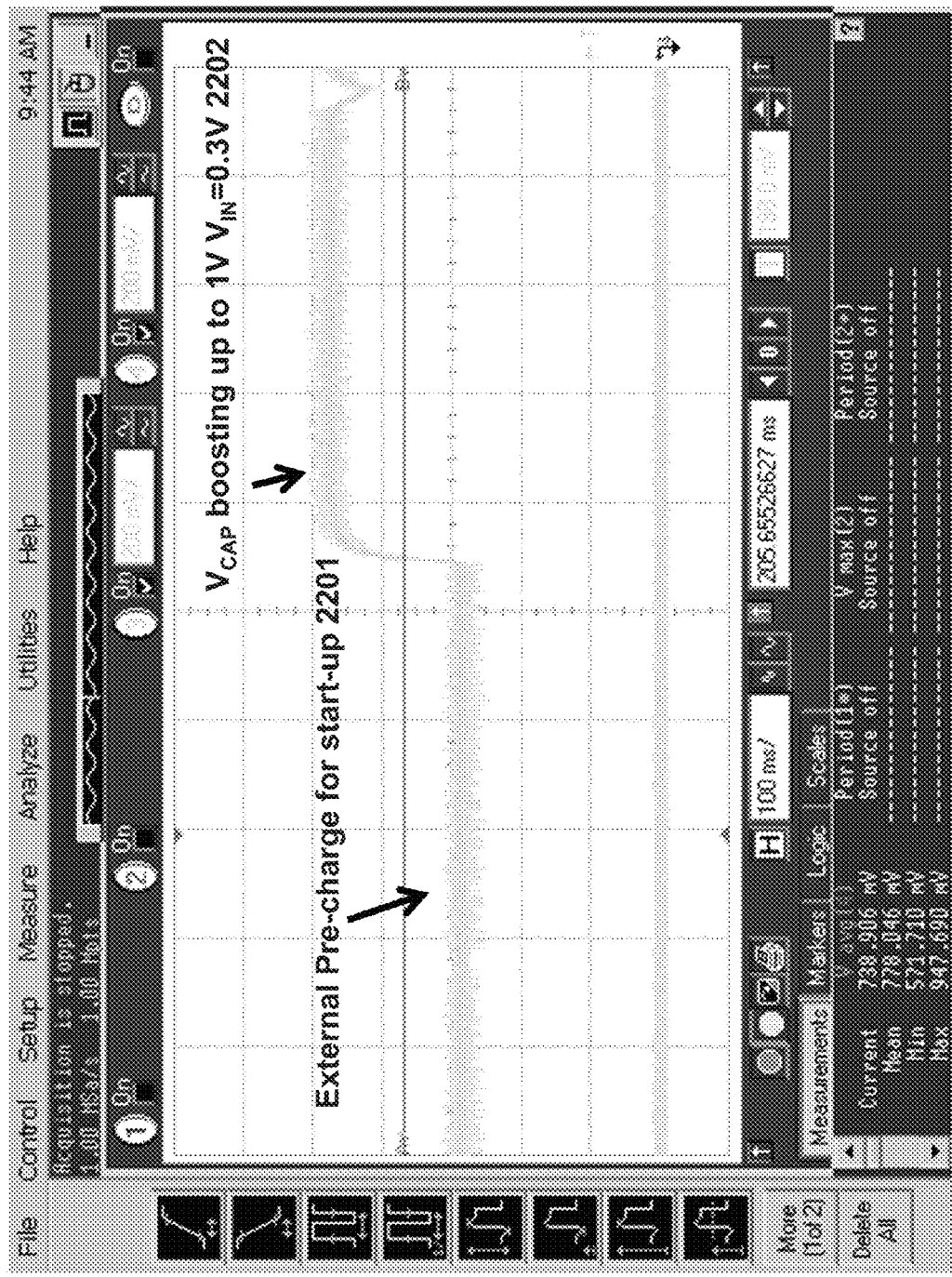
Fig. 22: Measurements showing kick-start from 590mV charging to 1V.

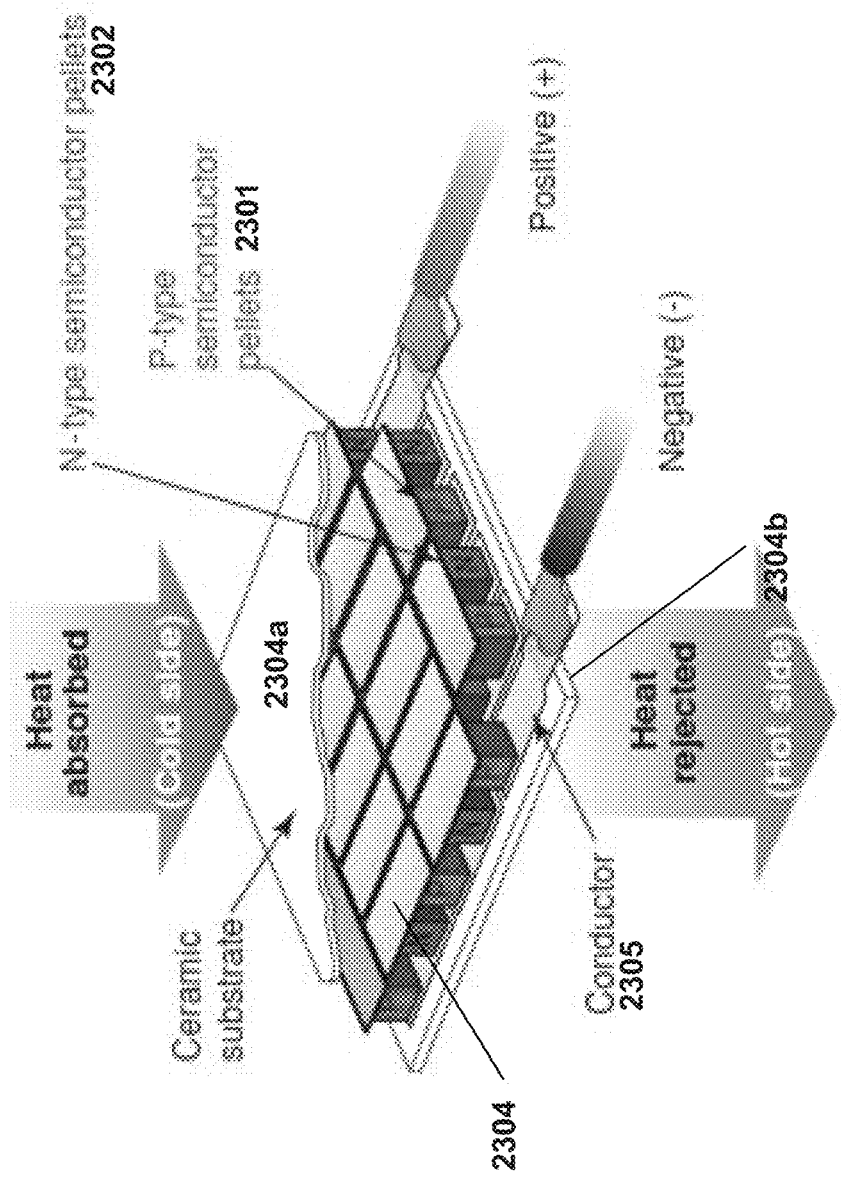
Fig. 23 Example Thermoelectric generator connecting large number of *p-n* junction to increase the operating voltage

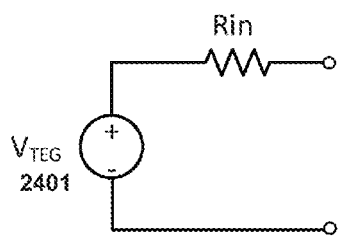
Fig. 24 Equivalent circuit of a thermoelectric generator
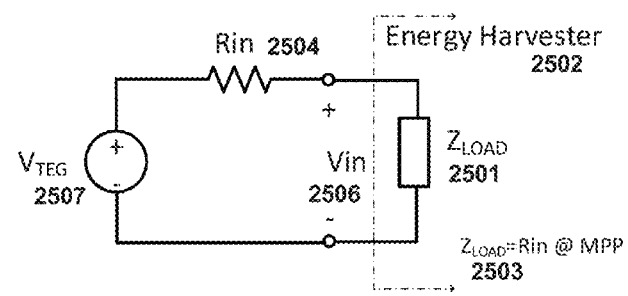
Fig. 25 Energy harvester harvests maximum energy when impedance of the harvester matches TEG's input resistance
Fig. 26 Maximum power point characteristics of a TEG energy harvester
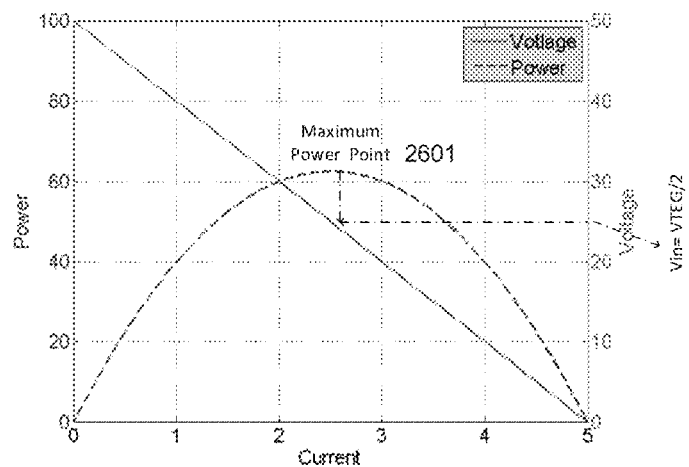

LOW INPUT VOLTAGE BOOST CONVERTER WITH PEAK INDUCTOR CURRENT CONTROL AND OFFSET COMPENSATED ZERO DETECTION

PRIORITY CLAIM

This application is a division of U.S. application Ser. No. 15/268,783 filed Sep. 19, 2016, which is a division of U.S. application Ser. No. 15/085,428 filed Mar. 30, 2016, which is a division of U.S. application Ser. No. 14/600,425 filed Jan. 20, 2015, which is a non-provisional of U.S. provisional application 61/928,621, filed Jan. 1, 2014, each of which applications are entitled "Low Input Voltage Boost Converter With Peak Inductor Current Control Offset Compensated Zero Detection," and each of which applications are incorporated herein by reference in their entireties.

FEDERALLY SPONSORED

This invention was made with government support under Award No. 1035771 awarded by the National Science Foundation and by the NSF NERC ASSIST Center (EEC-1160483). The government has certain rights in the invention.

FIELDS

Some embodiments generally relate to low power circuit designs, and more particularly, relate to a low input voltage boost converter peak inductor current control and offset compensated zero detection.

BACKGROUND

Low power devices that operate from as battery or from power harvested from an environment generate a low current or voltage to prolong the device operation. A boost converter can generate an output voltage that is higher than its input voltage given a low input voltage or current, and in this way the low power devices can harvest energy from a low input. When the input voltage is very low, however, offsets in the circuit of the boost converter can make the small input voltage hard to be detected and used accurately, and mismatch inside the boost converter can lead to significant variance such that a logic level of air output of a gate component is altered, and thus cause an inaccurate output voltage from the boost converter.

Various ambient sources can be used for harvesting energy, including light, vibration, thermal, and radio frequency. Energy harvesting can be implemented from outdoor sun-light. Usually, these energy harvesters are relatively large in size. They can be used to harvest large amount of power (in kWs) at high voltages. These energy harvesters can achieve high efficiency with very good maximum power point tracking. In contrast, micro-power energy harvesters using solar cell include wireless sensor networks (WSN) or Bluetooth sensor networks (BSN) energy harvesters. These can be used for low power systems. Usually, they are small in size and harvest very low amounts of energy (in µWs) due to the smaller size of solar cells and low ambient light associated with the indoor lighting condition. Another energy harvester that is commonly used for BSN application is a piezoelectric harvester, which harvests mechanical energy from vibration. These energy harvesters can harvest 10-100's of µW of available power. Electrical energy is generated when mechanical stress is applied on a piezoelectric material. Recently, piezoelectric harvesters suitable for BSNs have been demonstrated. These harvesters can harvest output power of few µW to 100's of µW at efficiencies above 80%. Harvesting energy from available RF power is another means of obtaining energy for BSNs, which can supply enough energy to power BSNs.

SUMMARY

Systems, methods, and apparatus for a boost converter that harvests energy from a DC input voltage and boosts it to a higher stored output voltage are described. Maximum power point tracking can be used to control the converter to be optimized for its input source, such as a thermoelectric generator (TEG) or photovoltaic cell. A control scheme can be used for the low side switch in the boost converter that varies the turn on time of the switch based on the value of the input voltage, $V_{IN}$, such that the peak inductor current is substantially constant to first order independently of $V_{IN}$ and $V_{OUT}$. To allow for both very low input voltages and low power, and thus high efficiency, operation comparators can be used for zero detection in the high side switch control that are both offset compensated and duty cycled.

Some embodiments described herein include a boost converter apparatus. The boost converter apparatus comprises an inductor configured to pass through an inductor current; a boost converter switch operatively coupled to the inductor, the boost converter switch configured to receive an input voltage and generate an output voltage when the boost converter switch is activated; and as switch control circuit operatively coupled to the boost converter switch. The switch control circuit is configured to receive the input voltage and send a control signal to activated the boost converter switch so as to maintain the inductor current substantially constant. The inductor current is independent of the input voltage and the output voltage.

Some embodiments described herein include a method to operate a boost converter for energy harvesting from a low voltage input. The method comprises receiving an input voltage, and generating two non-overlapping clock phase signals including a first clock phase signal and a second clock phase signal. The method further comprises operating a boost converter to generate an output voltage according to the first clock phase signal while maintaining an inductor current for an inductor substantially constant. The inductor current is independent, of the input voltage and the output voltage. The method further comprises performing offset cancellation to remove offset at a comparator of the boost converter according to the second clock phase signal.

Some embodiments described herein include a power-saving boost conversion apparatus. The apparatus comprises an inductor configured to pass through an inductor current; as boost converter switch operatively coupled to the inductor, the boost converter switch configured to activate a boost conversion switching cycle; and a zero detection comparator operatively coupled to the inductor and the boost converter switch. The zero detection comparator is configured to be activated for zero detection of the inductor current when the boost conversion switching cycle is activated, and is also configured to be deactivated after completion of the zero detection. The zero detection comparator further includes an offset cancellation component that is configured to remove offset in the zero detection comparator such that the zero detection comparator accurately detects a current change when the inductor current decreases to zero.

BRIEF DESCRIPTION OF THE DRAWINGS

FIG. 7 is a chart showing simulation results of MPP tracking, according to an embodiment.

FIG. 8 is a chart showing example boost control timing signals, according to an embodiment.

FIG. 9 is a data plot diagram showing example peak inductor current under different input voltages, according to an embodiment.

FIG. 10 is a block diagram showing an example low side (LS) timing circuit that sets the inductor current independently from the input voltage, according to an embodiment.

FIG. 11 is a data plot diagram illustrating example simulation results of the inductor current under a LS timing control signal (as in FIG. 10), according to an embodiment.

FIG. 12 provides a block diagram showing an example high side (HS) timing circuit and a chart showing timing control signals, according to an embodiment.

FIG. 13 provides a block diagram showing an offset-compensated and duty cycled (for low power) comparator (e.g., in FIG. 12), according to an embodiment.

FIG. 14 provides a die photograph of the boost converter and example specification parameters of the boost converter, according to an embodiment.

FIG. 15 provides a data plot showing example measured output for MPP tracking showing correct operation and recalibration, according to an embodiment.

FIG. 16 provides a data plot showing example measured low side activation timing with different input voltages, according to an embodiment.

FIG. 17 provides a data plot showing example measured efficiency with low side activation timing, according to an embodiment.

FIG. 18 is a data plot showing example variation of peak inductor current with process from a Monte-Carlo simulation, according to an embodiment.

FIG. 19-20 provide data plot diagrams showing example measured zero-detection scheme showing optimal zero detection for ratio up to 47 times, according to an embodiment.

FIG. 21 is a data plot diagram showing example measured operation of the boost converter with selected input voltages, according to an embodiment.

FIG. 22 is a data plot diagram showing example measurements showing kick-start of the boost converter, according to an embodiment.

FIGS. 23-26 provide example embodiments of a TEG, according to an embodiment.

DETAILED DESCRIPTION

Figure 1:
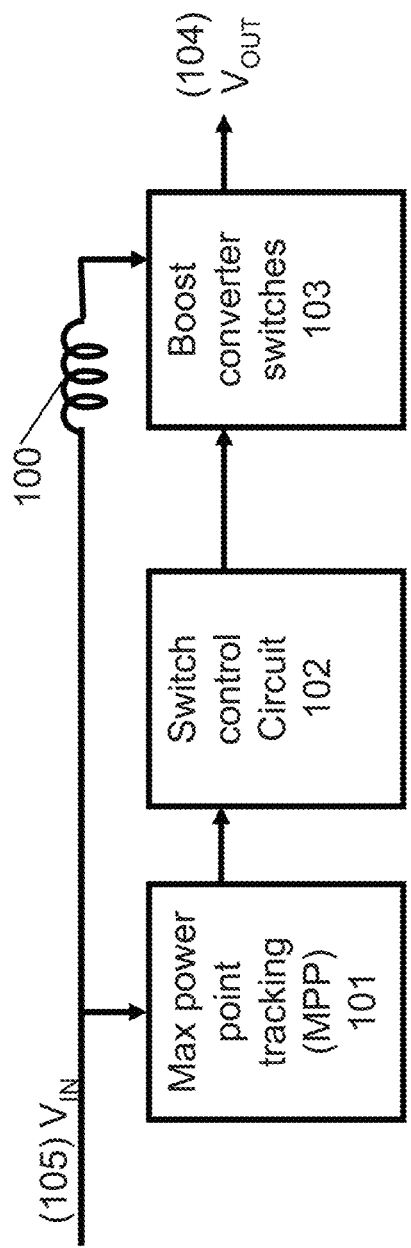
FIG. 1 is a block diagram showing the basic structure of the boost converter, according to an embodiment.

The low input voltage boost converter with peak inductor current control and offset compensated zero detection provide to boost converter scheme to harvest energy from sources with small output voltages. For example, the thermal gradient between skin and air, especially under clothing, may only be a few ° C. and the challenge of matching thermal impedances in the harvester packaging may leave thermoelectric generators (TEGs) with <1° C., which results in open circuit TEG outputs less than 30 mV. Some boost converters address this problem by lowering the allowable input voltage ($V_{IN}$), down to 20 mV, and by seeking lower start-up voltages, e.g. with the aid of a mechanical switch, RF kickstart, or a transformer. Some embodiments described herein provide a boost converter circuit that focuses on the challenge of harvesting from lower $V_{IN}$, since this permits operation from a TEG below a 1° C. gradient, reducing the likelihood of system power loss that would require a restart. In another aspect, harvesting from low $V_{IN}$ faces several key challenges; low input power demands ultra low power circuits for good efficiency, offsets make the small $V_{IN}$ hard to detect and use accurately, mismatch can cause significant variance in the peak inductor current ($I_{PEAK}$), and accurate zero detection typically involves high current comparators. Some embodiments described herein present a boost converter capable of harvesting from $V_{IN}$ down to below 10 mV at efficiencies that are 5-10% higher than prior work. A voltage-insensitive constant $I_{PEAK}$ control circuit, maximum power point (MPP) tracking, and the combination of offset compensation with duty cycled comparators enable these results and give efficiencies from 22% at a 10 mV input up to 84% at higher $V_{IN}$.

Some embodiments described herein include a thermoelectric boost converter that combines an $I_{PEAK}$ control scheme with offset compensation and duty cycled comparators to enable energy harvesting from TEG inputs as low as 5 mV to 10 mV, 50% to 75% lower than prior work. Maintaining substantially constant $I_{PEAK}$ allows the converter to sustain high efficiency across a broad $V_{IN}$ range, achieving 52% and 84% efficiency at 20 mV and 400 mV, respectively, which improves on prior designs. These features allow the converter to extend the operating window for thermal harvesting with low thermal gradients, which can be used, for example, for body worn sensors.

Some embodiments described herein include a control circuit that is configured to generate and control a peak inductor current for low or ultra-low voltage boost conversion. The peak inductor current is first-order independent of the input voltage and output voltage. For example, the control circuit can be configured to sample the input voltage ($V_{IN}$) and then generate a pulse with a duration inversely proportional to $V_{IN}$. This pulse is configured to control the low side switch (e.g., a low side switch from boost converter switches), such that a substantially constant peak inductor current is generated. For another example, the control circuit can be configured to sample $V_{IN}$ and use a square law dependency to produce a pulse with a duration inversely proportional to $V_{IN}$.

In another embodiment, the boost converter can operate in at least two phases. At least one phase is used for boosting and at least one phase is used for offset cancellation. For example, the boost conversion technique can be used in a boost converter of comparators that use both offset compensation for accurate zero detection and duty cycling for power savings. For example, a common gate amplifier can use an offset cancellation technique for low power zero detection.

In one embodiment, the boost converter can control peak inductor current for low or ultra-low voltage boost conversion. The peak current of the inductor is first-order independent of the input voltage ($V_{IN}$) and the output voltage from the boost converter, and can be generated by sampling the $V_{IN}$ based on square law dependency, as further discussed in FIGS. 3-4.

FIG. 1 is a block diagram showing the basic structure of the boost converter, according to an embodiment. As shown in FIG. 1, a boost converter can have an inductor 100, boost converter switches 103, a switch control circuit 102 and an optional max power point (MPP) tracking circuit 101. Input voltage 105, $V_{IN}$, is received by the MPP tracking circuit 101 and the inductor 100. The MPP tracking circuit 101 is connected to the switch control circuit 102. The boost converter switches 103 are connected to the Inductor 100 and the switch control circuit 102, and output an output voltage 104, $V_{OUT}$.

Figure 6:
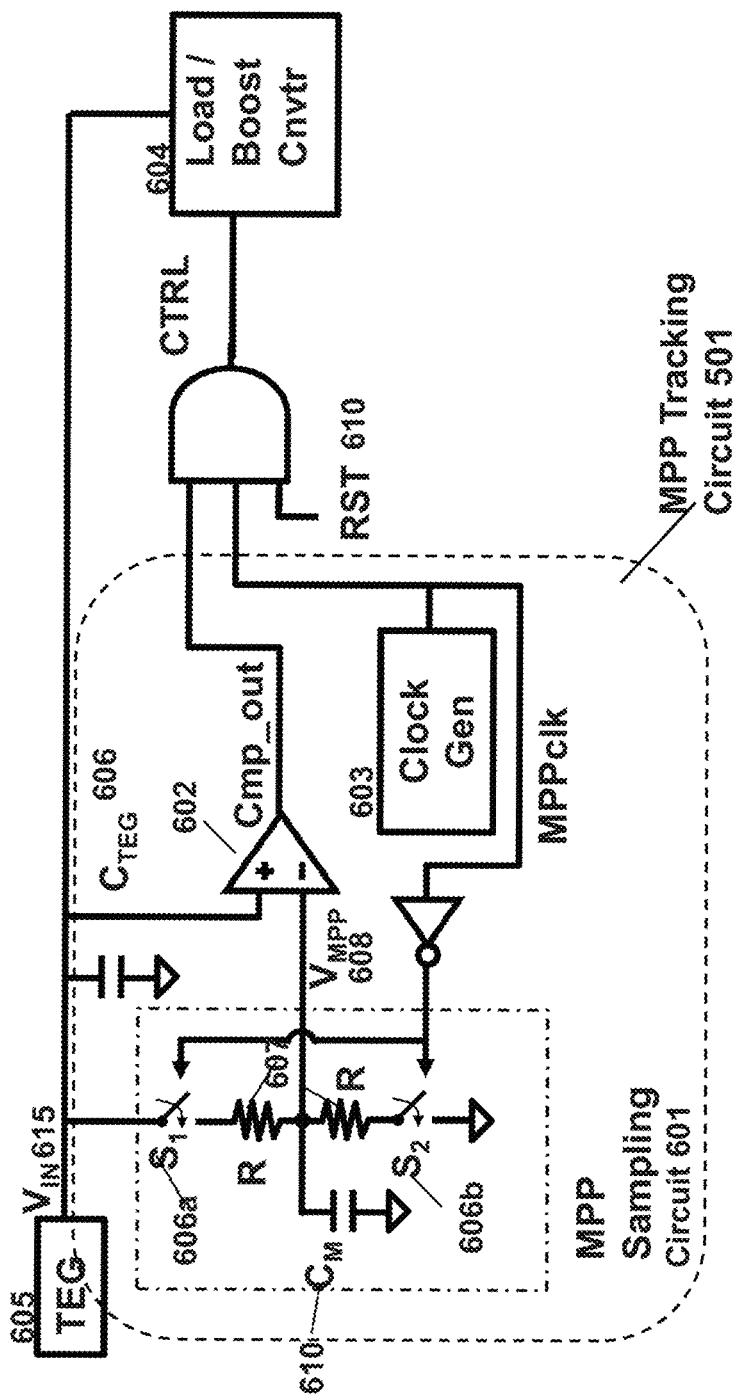
FIG. 6 is a block diagram showing the maximum power point (MPP) tracking circuit for a thermoelectric generator (TEG), according to an embodiment.

In one implementation, the MPP tracking unit 101 receives the input voltage $V_{IN}$ 105, e.g., from a TEG, and thus tracks the maximum power point of the TEG to operate the boost converter at the maximum power point of the TEG, as further discussed in FIG. 6. The switch control circuit 102 generates control signals to activate the boost converter switches 103 for boost conversion of the input voltage 105 and generate the output voltage 104. The operation of the switch control circuit 102 is further discussed in FIG. 2.

Figure 2:
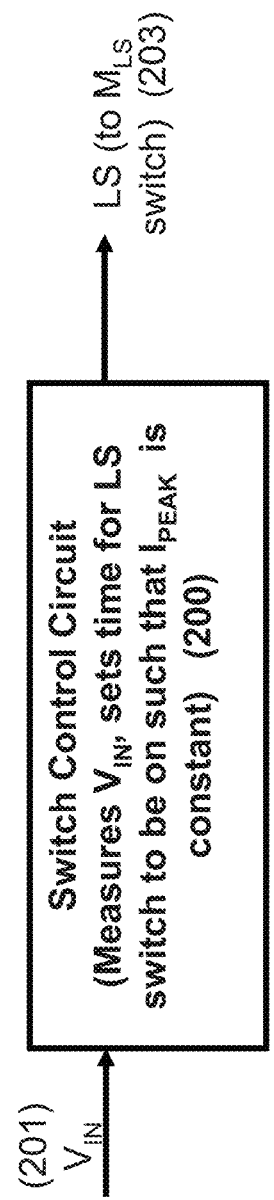
FIG. 2 is a block diagram showing a control circuit that varies the time that the low side switch is on to maintain a substantially constant peak inductor current, according to an embodiment.

FIG. 2 is a block diagram showing a control circuit (e.g., 102 in FIG. 1) that varies the time that the low side switch is on to maintain a substantially constant peak inductor current, according to an embodiment. As shown in FIG. 2, in one embodiment of the switch control circuit 200, the switch control circuit 200 can receive input voltage 201, $V_{IN}$, measure $V_{IN}$, set an on-time (or activation-time) for a low side (LS) switch ($M_{LS}$) 203 within the boost converter switches (e.g., 103 in FIG. 1) and output a signal to the LS switch ($M_{LS}$) 203 within the boost converter switches (shown in FIG. 1) such that the peak current $I_{PEAK}$ for the inductor (e.g., inductor 100 in FIG. 1) is substantially constant, e.g., 200. In other words, the switch control circuit 200 can vary the time that the LS switch ($M_{LS}$) is on based on the value of $V_{IN}$ to maintain a substantially constant peak inductor current ($I_{PEAK}$) of the inductor.

Figure 3:
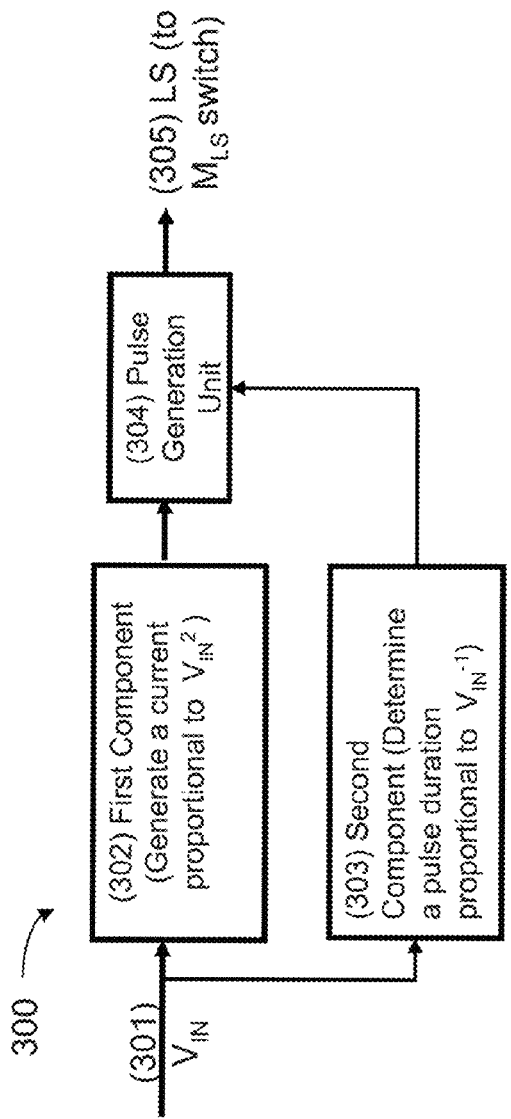
FIG. 3 shows a block diagram for one embodiment of a control circuit that varies the time that the low side switch is on to maintain a substantially constant peak inductor current, according to an embodiment.

FIG. 3 shows a block diagram of modules of a control circuit 200 in FIG. 2 that generates control signals to maintain the inductor current substantially constant, according to another embodiment. As shown in FIG. 3, a switch control circuit 300 has two portions. The first portion 302 is configured to generate a current proportional to the square of the input voltage 301 ($V_{IN}^2$). The second portion 303 is configured to generate a pulse width (or duration) proportional to the inverse of the input voltage ($V_{IN}^{-1}$). The two components 302 and 303 can be connected in series or in parallel, and provide outputs to a pulse generation unit 304 to generate a control signal. The switch control circuit 300 receives input voltage 301. $V_{IN}$, and outputs a signal to LS switch ($M_{LS}$) within the boost converter switches (shown in FIG. 1). The control signal from the pulse generation unit 304 and output to the LS switch ($M_{LS}$) 305 has an amplitude proportion to the square of the input voltage ($V_{IN}^2$) and a pulse width (or duration) proportional to the inverse of the input voltage ($V_{IN}^{-1}$). The switch control circuit 300 can vary the time that the LS switch ($M_{LS}$) is on based on the value of $V_{IN}$ to maintain a substantially constant peak current ($I_{PEAK}$) of the inductor.

Figure 4:
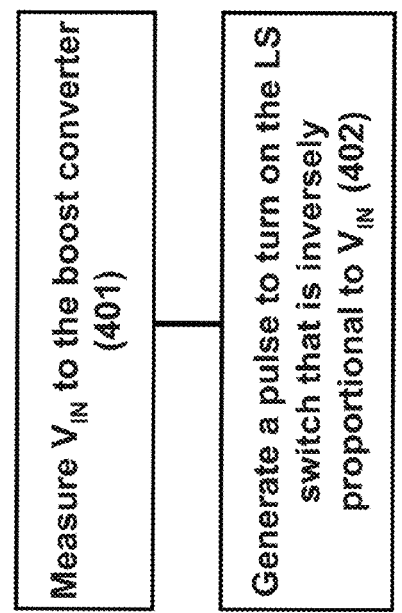
FIG. 4 shows a flow chart for a method of controlling peak inductor current to be substantially constant based on the value on the input voltage $V_{IN}$, according to an embodiment.

FIG. 4 shows a flow chart for as method (e.g., implemented by the switch control circuit 300 in FIG. 3) of controlling peak inductor current to be substantially constant based on the value on the input voltage $V_{IN}$, according to an embodiment. As shown in FIG. 4, a method can control the peak current ($I_{PEAK}$) of an inductor (e.g., 100 in FIG. 1) to be substantially constant. First, the input voltage ($V_{IN}$) to the boost converter switches is measured by a switch control circuit, e.g., at 401. Second, a pulse to turn on or activate the LS switch ($M_{LS}$) is generated by the switch control circuit, e.g., at 402. This pulse has an amplitude inversely proportional to the input voltage ($V_{IN}^{-1}$).

Figure 5:
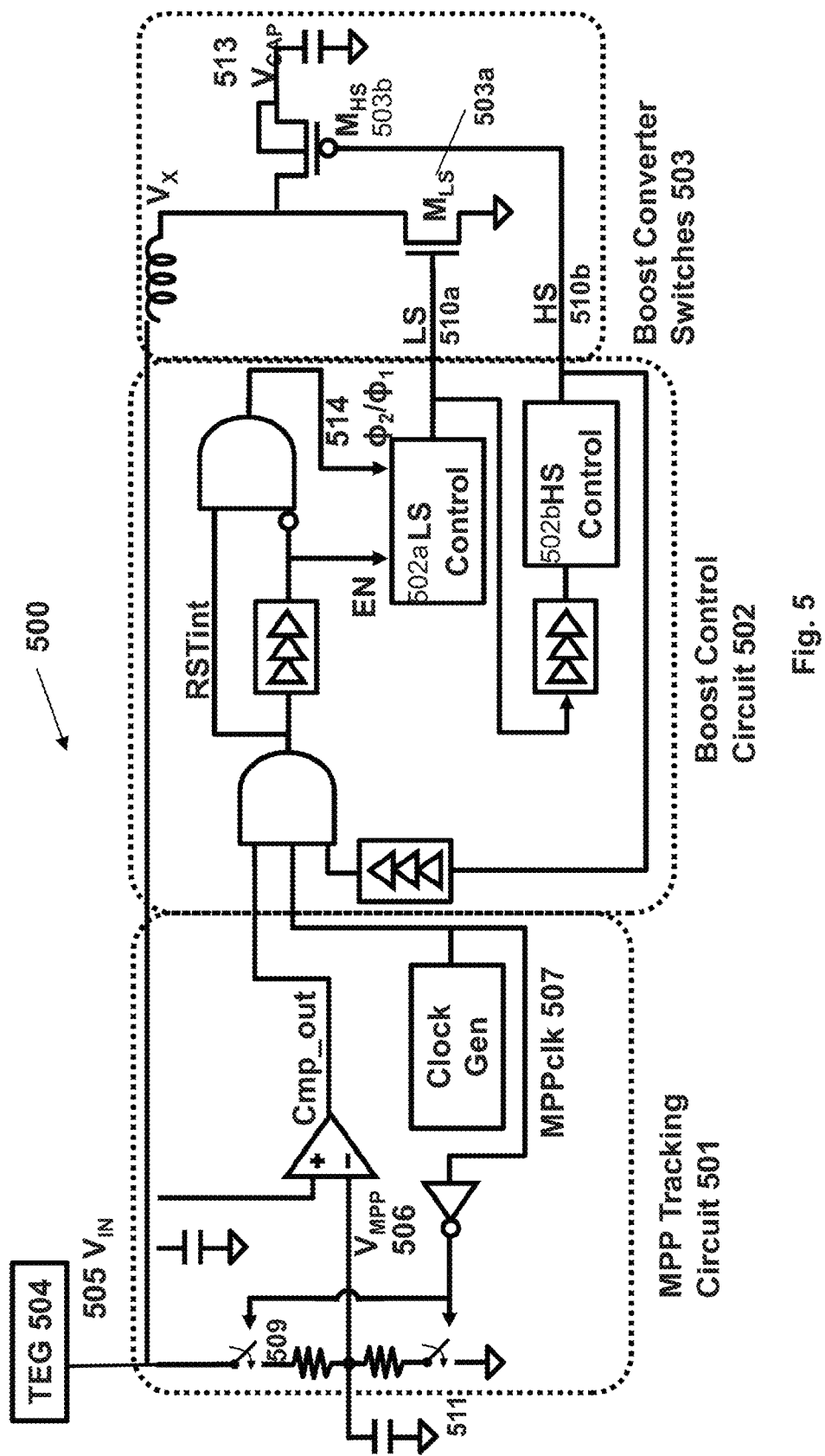
FIG. 5 is a block diagram showing a detailed circuit implementation of the boost converter structure (as shown in FIG. 1) with timing to set substantially constant inductor current, according to an embodiment.

FIG. 5 is a block diagram showing a detailed circuit implementation of the boost converter structure 500 (as shown in FIG. 1) with timing to set substantially constant inductor current, according to an embodiment. As shown in FIG. 5, the boost converter 500 includes a MPP tracking circuit 501, a boost control circuit 502 to generate three phases of control timing, and boost converter switches 503 including the High Side (HS) 503b and Low Side (LS) 503a. TEGs 504 provide max power when $V_{IN}$ 505 remains above half of the open circuit TEG 504 output voltage, so the MPP circuit 501 stores this value as $V_{MPP}$ 506 at the low pulse of MPPclk 507, which also disables the boost converter 500. When MPPclk 507 is high, the boost converter 500 operates until $V_{IN}$ (505)<$V_{MPP}$ (506), which turns off $M_{LS}$ 503a and $M_{HS}$ 503b, allowing $V_{IN}$ 505 to recover. The design implements a pulse frequency modulation (PPM) converter in discontinuous conduction mode with the pulse width set to maintain a substantially constant $I_{PEAK}$, as described below.

In FIG. 5, the boost converter 500 harvests energy from the TEG 504. The boost converter 500 is a switching mode power converter. For example, first, the signal LS 510a goes high and transistor $M_{LS}$ 504a is turned on. This connects the inductor 509 between TEG 504 and ground 511. As a result the current in the inductor 509 starts rising and starts storing energy. It obtains its energy from TEG 504. After a well-defined time, LS 510a is brought down to ground and $M_{HS}$ 503a is turned on or activated. The stored current in the inductor 509 discharges on the capacitor and raises the voltage of $V_{CAP}$ 513. Additional descriptions of the proposed converter 500 including the MPP tracking unit 501, boost control circuit 502 and the LS/HS switches 503a-b are discussed in FIGS. 6, 10 and 12-13.

In one implementation, the energy that is taken from TEG 504 can be stored on capacitor. $V_{CAP}$ 513 without loss. However, this may not be realized in practical system and some energy losses are involved. The efficiency of the converter, defined as the ratio of power delivered to the load to the power obtained from source is the measure of the performance. Some of the losses that are involved are explained as following. The switches $M_{LS}$ 503a and $M_{HS}$ 503b have finite resistance and they carry current during the switching cycle. As current flows through a resistor, conduction loss takes place in the form of Joule's heating in the switches. Also, the switches $M_{LS}$, $M_{HS}$ (503a-b) and other circuits in the boost converter switch 503 in a periodic or repeated) fashion to harvest energy. This switching also involves energy loss and is termed simply as switching loss. In addition, various bias current circuits may be included to implement the control of the converter. This results in power loss that is always present and is called static loss. To maximize or improve the efficiency of the boost converter, all these losses are to be minimized or reduced. Finally, maximum power can be harvested from TEG 504 when the efficiency of the boost converter 500 is maximum and the boost converter's operating point substantially corresponds to the maximum power point of TEG 504. Further discussion of the maximum power point of TEG 504 is provided in connection with FIGS. 24-26.

The MPP tracking circuit 501 of the boost converter 500 can operate the converter at the maximum power point. Components of the MPP tracking circuit 501 are further discussed in FIG. 6. The boost control circuit 502 includes a LS control unit 502a and a control unit 502b, which generate a LS timing signal and a HS control signal, respectively. Components of the boost control circuit 502 are further discussed in FIGS. 10 and 12-13. The boost converter switch 503 can achieve maximum possible efficiency for the given operating condition, while MPP tracking circuit 501 tracks the MPP point of the TEG 504 and operates at that point.

FIG. 6 is a block diagram showing the maximum power point (MPP) tracking circuit (501 in FIG. 5) to harvest energy from a TEG, according to an embodiment. The MPP tracking circuit 501 shown in FIG. 6 is connected to a AND gate 620 as part of a boost control circuit 502 in FIG. 2) and the load/boost converter 604 (similar to the boost converter switches 503 in FIG. 5). The MPP tracking circuit 501 includes a MPP sampling circuit 601, a comparator 602 and a clock generator 603. The clock generator 603 (labeled as "clock gen" in FIG. 6) generates a clock signal with period of 150 ms. This clock generator 603 is used to generate a pulse that goes low for 10 ms as shown in simulation in FIG. 7. When this pulse goes low, the boost converter 604 is disabled, as a result the load current goes to zero. Because no load is connected to the output of TEG 605, the TEG voltage goes to its open circuit voltage $V_{TEG}$ (not shown in FIG. 6). This pulse is also used to close the switch $S_1$ 606a and switch $S_2$ 606b shown in FIG. 6. The two resistors 607 get connected to the voltage from the TEG 605 and $V_{MPP}$ node 608 goes to the voltage $V_{TEG}/2$ through the resistor divider (as illustrated by the two resistors 607). Therefore, the capacitor $C_M$ 610 gets charged to $V_{TEG}/2$. The output voltage of $V_{MPP}$ node 608 is maintained by the capacitor $C_M$ 610. The MPP sampling circuit 601 samples the half of the TEG's open circuit voltage and stores it on the capacitor $C_M$ 610. After the pulse from 603 goes high again, the boost converter 604 starts drawing the current from the TEG 605. As the boost converter 604 draws current from the TEG 605, the voltage level of $V_{in}$ 615 will start decreasing. The boost converter 604 increases the current drawn from TEG source 605 by increasing the frequency of switching. As long as the output of comparator 602 is high the boost converter switches 604 at a higher frequency and the current drawn from the TEG source 605 is high.

FIG. 7 shows the simulation result of the MPP tracking circuit (501 in FIG. 5 which is detailed in FIG. 6). The clock signal (labeled as "MPPclk") generated at clock generator 603 is shown at 701. For example, when the current is drawn, the output voltage of TEG (labeled as "$V_{TEG}$") 605 goes low, and eventually reaches $V_{MPP}$ 608 value which is set to $V_{TEG}/2$. As $V_{TEG}$ crosses $V_{MPP}$ value, the comparator output (shown at 705) goes low and the boost converter 604 is disabled. As the boost converter 604 is disabled, the $V_{in}$ 615 voltage will start going high and it will go above $V_{MPP}$ 608 (shown at 703). At this point comparator 602 output goes high and converter 604 is enabled again. This way the output voltage of TEG 605 is maintained at $V_{TEG}/2$ which is the maximum power point of the boost converter circuit (e.g., as shown in FIG. 26). The output voltage of the TEG $V_{TEG}$ 605 (shown at 702) is maintained at its maximum power point by the control circuit (e.g., 502 in FIG. 5) with a voltage ripple around it. The amount of voltage ripple is a function of capacitor 606 connected at TEG 605. The voltage ripple can be made negligibly small by connecting a large capacitor 606. In the simulation shown in FIG. 7, 5 µF capacitor is used for capacitor 606 at the output. This way, the boost converter circuit is maintained at its maximum power point. The output voltage of the boost converter is sampled frequently using the clock signal MPPclk, which helps in keeping track of the TEG's open circuit voltage to account for the dynamic changes in the operating condition of the boost converter circuit.

FIG. 8 shows a timing diagram of the control signals (e.g., generated at 502 in FIG. 5) for the boost converter showing use of two phase signals φ1 801 and φ2 802, where φ1 801 is used for cancelling mismatch to harvest at low voltage, in one implementation, the boost control circuit 502 generates three non-overlapping clock phase signals, φ1 801 LS 803, and HS 804. The φ1 801 pulse width is set by a delay line (e.g., 514 in FIG. 5), and this extra phase defines a timing phase that allows for substantially constant $I_{PEAK}$ control in the LS timing and offset compensation in comparators of the switching control circuit (e.g., 502 in FIG. 5). The LS 803 pulse width is set to keep a substantially constant $I_{PEAK}$ regardless of the values of $V_{IN}$ (e.g., 505 in FIG. 5) or $V_{CAP}$ (e.g., 513 in FIG. 5) and the HS pulse 804 is controlled to turn off $M_{HS}$ (e.g., 503b in FIG. 5) when $I_L=0$. Keeping a substantially constant $I_{PEAK}$ can maximize or improve efficiency across a range of input voltages $V_{IN}$ because a substantially constant $I_{PEAK}$ sets the boost converter at the balance point between larger conduction and switching losses. $I_{PEAK}$ control also controls the ripple at input voltage $V_{IN}$. Known approaches (controlling MOSFET's $R_{ON}$) to set $I_{PEAK}$ are power-expensive and sensitive to mismatch (±20-40% error), so these known techniques have not been accomplished in micro-power boost converters previously. To improve efficiency, the boost converter 500 maintains a substantially constant $I_{PEAK}$ across as wide $V_{IN}$ range, substantially centered at a selected peak efficiency current.

The boost converter 500 involves charging the inductor with an inductor current and storing the charged energy on the capacitor on $V_{CAP}$ (e.g., 513 in FIG. 5). The signal LS 803 and HS 804 are used to accomplish this switching. The signal LS 803 goes high to turn on $M_{LS}$ transistor 503a in FIG. 5. This starts charging the inductor with an increasing inductor current. After a well-defined time, which sets the inductor peak current, the inductor current is discharged on the capacitor raising $V_{CAP}$. This is done when HS 804 goes low. Usually, LS signal 803 and HS signal 804 are controlled to control the performance in a boost converter 500. The boost converter 500, however, can harvest energy from very low input voltage such as 10 mV. The effect of mismatch or non-idealities in the boost converter circuit should be addressed if energy is harvested at low voltage levels. The mismatch between the threshold voltage of two transistors can itself be as high as ~50 mV. It may be difficult to harvest energy at low voltages if the mismatch between the devices in the boost converter circuit, such as a comparator, is not compensated. Therefore, the energy harvesting control as implemented by the switching control circuit 502 in FIG. 5 is broken down into two phases as controlled by the phase signals φ1 or φ2. In phase one, designated by control signal φ1 801, the mismatch throughout the boost converter circuit is compensated. Phase one φ1 801 is followed by phase two φ2 802, which includes control and generation of signals LS 803 and HS 804.

FIG. 9 is a data plot diagram showing example peak inductor current under different input voltages. The LS signal (e.g., 803 in FIG. 8) controls the amount of energy harvested from TEG (e.g., 504 in FIG. 5). During the time when LS 803 is on the inductor current increases and reaches peak value $I_{PEAK}$. The value of the peak current depends on the on-time of the LS switch $M_{LS}$ (503a in FIG. 5). The longer the on-time is, the higher would be the peak currents. For micro-power design, the inductor current is discharged into the storage capacitor on $V_{CAP}$ (513 in FIG. 5). So, the energy transferred from TEG in each cycle is given by $E=0.5\times LI^2_{PEAK}$.

Losses are involved when transfer of energy happens. These are switching and conduction losses. The conduction loss is dependent on $I_{PEAK}$. The efficiency of the boost converter greatly depends on the value of $I_{PEAK}$. FIG. 9 shows the variation of the efficiency with $I_{PEAK}$ for different input voltages. As shown in FIG. 9, at lower value of $I_{PEAK}$, the switching loss in the boost converter dominates and lowers the efficiency. This happens because the energy transferred, as shown in the equation above, is small compared to the switching loss. At higher value of $I_{PEAK}$, the conduction loss increases greatly to reduce the efficiency. There are values of $I_{PEAK}$ where the efficiency can be maximized. Therefore, it is desirable to control the values of $I_{PEAK}$.

In one implementation, a low power control circuit (e.g., as shown in FIG. 10) can be included in the boost control circuit 502 in FIG. 5 and used to control the peak inductor current. The boost converter has very small dependence (±2.5%) of the peak inductor current on the input voltage $V_{IN}$ or the capacitor voltage $V_{CAP}$ because of mismatch between the components within the boost converter circuit.

FIG. 10 is a block diagram showing an example low side (LS) timing circuit (e.g., as the LS control 502a in the boost control circuit 502 in FIG. 5) that sets the inductor current independently from the input voltage to first order, according to an embodiment. The control circuit 1000 as shown in FIG. 10 generates the timing for LS signal (e.g., also 803 in FIG. 8). The value of the peak inductor current can also be programmed by this control circuit 1000. The control circuit 1000 uses phase 1 and phase 2 (e.g., also 801 and 802 in FIG. 8) of a switching cycle to generate the timing for LS.

As shown in FIG. 10, during phase $\phi1$ (e.g., 801 in FIG. 8) (connected to the transistor that outputs 1021 in FIG. 10), node a 1001 is connected to $V_{IN}$ 1004, which is the output voltage of TEG (not shown), $V_{CLS}$ 1005 is held to ground, and comparator C1 1006 is disabled. The output of LS 1016 is set to ground 1007. The transistor $M_{P1}$ 1011 is made weak (e.g., the gate-to-source voltage of $M_{P1}$ 1011, is lower than the threshold voltage of $M_{P1}$), which sets the output voltage of node b 1002 and is given by $V_{IN}$ (1004)+$V_{TM1}$, where $V_{TM1}$ is threshold voltage of the transistor $M_1$ 1012. $M_{P1}$ 1011 is sized to let $M_1$ 1012 determine the voltage at node c during phase $\phi1$ and to keep $M_1$ 1012 in saturation in $\phi_2$. Weak $M_{P1}$ 1011 drives $M_1$ 1012 very close to its threshold voltage.

In phase $\phi2$ (e.g., 802 in FIG. 8) (connected to the transistor that outputs 1002 in FIG. 10), node a 1001 is connected to ground while the connection between node b 1002 and node c 1004 is removed. During $\phi_2$, current in $M_1$ 1012 (long channel) is proportional to $(V_{GS1}-V_{TM1})^2$, where $V_{GS1}$, the gate-to-source voltage of transistor $M_1$, is equivalent to the output voltage of node b 1002 minus the voltage of node a 1001 (which is zero because node is connected to ground during phase $\phi2$), the nodes discussed above, and thus the current in $M_1$, $I_{LSctl}$ simplifies to $(V_{IN})^2$. This current 1014, $I_{LSctl}$, is mirrored and integrated onto $C_{LS}$ 1015 until $V_{CLS}$ 1005 reaches the value of $V_{IN}$. Due to the dependence of current $I_{LSctl}$ 1014 on $V_{IN}$ 1020, the time that LS is on ($T_{ON\_LS}$) is inversely proportional to $V_{IN}$ 1020 (assuming a negligible voltage drop across ($M_{LS}$), which sets $I_{PEAK}$ at a substantially constant value, $C_{LS}/(k*L)$, first-order independent of $V_{IN}$ and $V_{CAP}$.

The transistor $M_1$ 1012 is designed to be in saturation and sets the current $I_{LSctl}$ 1014, which is given by: $I_{LSctl}=k\times(V_{IN}+V_{TM1}-V_{TM1})^2=k\times(V_{IN})^2$ The current $I_{LSctl}$ 1014 generated for LS control is made proportional to the square of the input voltage 1004, which is used for the generation of LS timing. This current $I_{LSctl}$ 1014 is mirrored to charge the capacitor $C_{LS}$ 1015. As $\phi2$ 1022 goes high, the capacitor $C_{LS}$ 1015 starts charging. The timing of LS 1016 is given by the charging of the capacitor $C_{LS}$ 1015. Once $\phi2$ 1022 goes high, LS 1016 goes high and the capacitor $C_{LS}$ 1015 starts charging. Once the voltage of the capacitor $C_{LS}$ 1015 crosses the value of $V_{IN}$ 1004, output of the comparator C1 1096 goes low, which resets the flip-flop and brings LS 1016 to ground.

The offset cancellation of comparator C1 1003 in phase $\phi_1$ 1021 enables charging at voltages measured down to, for example, 5 mV. When the comparator C1 1003 detects that $V_{CLS}>V_{IN}$, it turns off the LS pulse 1016. The AND gate 1024 permits the MPP circuit (e.g., 501 in FIG. 5) to rapidly disable $M_{LS}$ when RSTint (1025)=0 (FIG. 1). This control circuit 1000 consumes no static power since the comparator is on only during times of high power transfer and high $I_L$, making its power a component of the switching loss, and the control circuit 1000 controls $I_{PEAK}$ with an error of ±2.5% across $V_{CAP}$ and $V_{IN}$, a lower sensitivity than similar schemes in higher power converters. The variation across process (k parameter) is addressed by digitally tuning capacitor $C_{LS}$ 1015.

In one implementation, turning off or deactivating the HS switch at the $I_L=0$ point (zero detection) is desirable for efficient operation. Known comparator-based schemes have been considered too high power for low $V_{IN}$ boost converters, so $V_X$ may be detected after $M_{HS}$ turns off and use the behavior of $V_X$ to correct timing for the next cycle. Further discussion of HS timing and zero detection is provided in connection with FIGS. 12-13.

FIG. 11 shows the timing diagram for the generation of LS 1016 in FIG. 10. The timing of LS is given by, $$I_{LSctl} = C_{LS}\frac{dv}{dt}$$

As capacitor (C1 1103 of FIG. 10) charges from 0 to $V_{IN}$, the time to turn on LS 1101 can be calculated as:

$$T_{ON\_LS} = C_{LS}\frac{V_{IN}}{I_{LSctl}} = \frac{C_{LS}}{kV_{IN}}$$

This is the time for which the inductor is kept on. This time increases as $V_{IN}$ decreases.

Assuming negligible drop across $M_{LS}$, the basic equation for the inductor is $$L\frac{dI}{dt} = V_{IN}$$

The inductor current charges from 0 to $I_{PEAK}$ during the time LS 1016 is on, $$I_{PEAK} = \frac{V_{IN}T_{ON\_LS}}{L} = \frac{V_{IN}C_{LS}}{kLV_{IN}} = \frac{C_{LS}}{kL}$$

which gives the formula for peak inductor current. The proposed circuit of FIG. 10 reduces the calculation of peak inductor current into a very compact form. The expression shows that the peak inductor current $I_{PEAK}$ is first-order independent of $V_{IN}$ and $V_{CAP}$ voltages. It depends on the value of the capacitance of capacitor $C_{LS}$ 1015 and the inductor value L. By controlling the value of $C_{LS}$, peak inductor current $I_{PEAK}$ can be set to a substantially constant value, which gives the maximum efficiency as shown in FIG. 11. The constant k in the expression is a function of process and temperature. As a result, the peak inductor becomes a function of variation in process. The values of capacitor $C_{LS}$ and the inductor L can be changed for a given embodiment. For example, they can be changed to compensate for the process variation. Often, it is not practical to change the value of inductance either because of the cost involved or because of the size as it is an off-chip component. However, the capacitor is on-chip and can easily be controlled. For example, to address the variation using the capacitor $C_{LS}$, 5-bit binary control on capacitor may be used.

Chart 1102 shows the simulation result for the peak inductor current at different values of $V_{CAP}$ and $V_{IN}$. Simulation shows that the boost converter circuit shows very small dependence on $V_{CAP}$ or $V_{IN}$. The peak current value decreases at lower values of input voltage $V_{IN}$. The capacitor $C_{LS}$ can be trimmed to increase the peak inductor current.

FIG. 12 provides a block diagram showing an example high side (HS) timing circuit and a chart showing timing control signals of phase 1 (1207) and various control signals, according to an embodiment. As discussed in FIG. 10, boost conversion can use the transfer of this energy stored in the inductor to the capacitor on $V_{CAP}$ shown in FIG. 10, and also shown at 1204 in FIG. 12. This is achieved by controlling the high side switch of the converter. The HS switch should be controlled well to achieve better efficiency. For example, once the inductor (100 in FIG. 1; not shown in FIG. 12) has charged to $I_{PEAK}$, the HS signal 1201 goes low and transistor $M_{HS}$ 1202 turns on. The inductor current (current of 100 in FIG. 1; now shown in FIG. 12) starts discharging on to the capacitor (1205). At this point, the node $V_X$ 1203 goes above $V_{CAP}$ 1204 to satisfy the conduction. As capacitor 1205 charges the inductor current reduces and $V_X$ 1203 voltage drops. Thus the inductor current eventually goes to zero and $V_X$ 1203 becomes equal to $V_{CAP}$ 1204. The switch $M_{HS}$ 1202 is turned off at this point, else the inductor current reverses the direction and it starts taking charge away from $V_{CAP}$ 1204, which would reduce the efficiency. Similarly, if the switch is turned off before inductor current goes to zero, the remaining current would discharge through a high impedance diode, which also hurts the efficiency. Therefore, inductor current's zero crossing is detected for accurate timing. This is usually termed as zero detection, as shown in the circuit for generating the HS timing using the zero detection in FIG. 12.

As shown in FIG. 12 shows an embodiment where comparator $C_2$ 1205 detects the inductor current (not shown in FIG. 12) $I_L=0$ by comparing $V_X$ 1203 and $V_{CAP}$ 1204 and immediately turns off $M_{Hs}$ 1202. The comparator itself uses as known gate topology as shown in FIG. 13 that is turned on only during the HS 1201 and φ1 1207 pulses. Because $I_L$ (and power transfer) is large over most of that time, the extra "switching loss" from comparator $C_2$ 1205 reduces efficiency by only about 0.02%, but its high on-current (~20 μA) gives as fast response. Offset can be problematic for converters working from low $V_{IN}$. Phase φ1 provides for offset compensation in the HS comparator 1205.

For example, comparator $C_2$ 1205 is used and it compares the $V_X$ node 1203 with $V_{CAP}$ 1204. Once $V_X$ 1203 crosses $V_{CAP}$ 1204 and goes below it, the comparator output of C2 1205 goes low and turns off the switch $M_{HS}$ 1202. The HS signal 1201 is generated using the zero detection comparator $C_2$ 1205 by monitoring the node $V_X$ 1203. Several issues related to zero detection exist. First, the performance of the comparator should be very good. If the delay through the comparator is high, the exact timing of HS control cannot be met. Second, it is desired that the power consumption of the comparator is small because the power consumption will add to the loss in the boost converter. Finally, the mismatch between the devices inside the comparator can result in high offset, which can alter the zero detection. This is often particularly desirable for harvesting from very low input voltage, as offset itself can be much higher than the input voltage $V_{IN}$ 1209. Therefore, the offset due to mismatch should be cancelled.

FIG. 13 provides a block diagram showing an offset-compensated and duty cycled (for low power) comparator (e.g., 1205 in FIG. 12), according to an embodiment. In one implementation, a common gate amplifier 1301, which is biased at 20 μA of quiescent current, may be used. The use of common gate amplifier 1301 generally provides good performance; however, if this comparator 1205 is always on, then the static power of the boost converter will become high, resulting in very low efficiency at low input voltages of $V_{IN}$. The comparator (C2 1205 in FIG. 12) is duty-cycled to address this, it is turned on only when the switching happens. For example during MPP tracking the switching happens at low frequency. Every time a switching cycle is activated through the MPP comparator (e.g., 602 in FIG. 6), the zero detection comparator (C2 1205 in FIG. 12) is turned on and is turned off after the completion of zero detection. Therefore, the comparator (1205 in FIG. 12) as detailed in FIG. 13 is on only during the switching cycle and its power consumption is the component of switching loss. The power overhead because of the zero-detect comparator is greatly reduced, reducing the efficiency of the boost converter (not shown in FIG. 13) that includes the comparator shown in FIG. 13 by ~2% at $V_{IN}$ of 10 mV and by ~0.3% at $V_{IN}$ of 100 mV.

While the performance and the power issues are addressed as explained above, the HS control circuit also addresses the offset issues. The offset in the HS control circuit is cancelled in phase φ1 1301 of the switching cycle. In φ1 1301, nodes d 1302 and e 1303 are set at $V_{CAP}$ 1307 while node f 1303 is set at $V_{SS}$, and switch T1 1308 is turned on while switch T2 1309 is off. The feedback from node g 1304 sets $V_{OFFSET}$ 1310 to remove offset in the comparator. If there is no offset in the circuit, $V_{OFFSET}$ (1310)=$V_{REF}$ (1311). The measured comparator offset after compensation was <1 mV. In instances, the other comparators in the converter use a similar offset compensation circuit as shown in FIG. 13. After offset compensation, zero detection is performed. Once LS goes low the comparator is enabled in phase φ2. Node d 1302 is connected to $V_{CAP}$ 1307 while e 1303 gets connected to the node of $V_X$ 1315 and switch T1 1308 is turned off while T2 1309 is on. The comparator is configured to normal operation. As inductor current decreases, $V_X$ 1315 starts going down. Once $V_X$ 1315 crosses $V_{CAP}$ 1307, the common gate amplifier 1301 changes state and comparator output goes low which turns off $M_{HS}$ (1202 in FIG. 12). The higher performance and offset cancellation method provide for correct zero detection. The measured $V_X$ 1315 waveform (e.g., see 2005 FIG. 20) shows no overshoot or undershoot at $t_1$ indicating ideal zero detection, which confirms that the HS timing is correctly turning off or deactivating $M_{HS}$ when $I_L=0$.

In one implementation, the boost converter circuit uses a start-tip voltage. It may not be practical to start charging up from low input voltages such as 10 mV from a TEG. Several start-up techniques are proposed in literature.

FIG. 14 provides a die photograph of the boost converter and example specification parameters of the boost converter, according to an embodiment. The circuit of boost converter of FIG. 14 is implemented in 130 nm CMOS process. The resistance of $V_{IN}$ to $V_{SS}$ 140 line is targeted to 300 mΩ which included bond-wire, inductors parasitic DC resistance, board's trace resistance and resistance of the MOS transistor $M_{LS}$ 1404. The inductor used for the design was 10 μH coil-craft inductor. The total area for the implementation was 0.12 μm². Three Input/Output (I/O) pads may be used for $V_{SS}$ 1401 and two I/O pads for $V_{CAP}$ 1403.

FIG. 15 provides a data plot showing example measured output for tracking showing correct operation and recalibration, according to an embodiment. As shown in FIG. 15, the pulse period where boost converter is disabled and switching stops is illustrated at 1501. The maximum power point voltage is sampled at this point and stored on to the capacitor, which is used for the implementation of control.

FIG. 16 provides a data plot showing example measured low side activation timing with different input voltages, according to an embodiment. The LS pulse width is directly proportional to peak inductor current. FIG. 16 shows small dependence of peak inductor current change with $V_{CAP}$ for a given $V_{IN}$, e.g., at 1601. With decreasing $V_{IN}$, the LS time increases, e.g., at 1602. As $I_{PEAK}$ is directly proportional to $V_{IN}$, decreasing $V_{IN}$ requires that $T_{ON}$ should increase to maintain substantially constant peak inductor current. FIG. 16 shows increasing $T_{ON}$ with decreasing $V_{IN}$, e.g., at 1602.

FIG. 17 provides a data plot showing example measured efficiency with low side activation timing at various input voltages $V_{IN}$, according to an embodiment. The efficiency is measured by changing the time period of LS switch, which shows that peak efficiency point exists for each value of $V_{IN}$ in the figure. At very low value of $T_{ON}$ 1701 the peak inductor current is low and switching loss dominates resulting in lower efficiency with at higher value of $T_{ON}$ peak inductor current is high and it causes higher conduction loss again reducing the efficiency. The $T_{ON}$ time 1701 for the peak efficiency point for each $V_{IN}$ increases with decreasing $V_{IN}$. These measurements coincide with controlling the peak inductor current, $I_{PEAK}$ to maximize or improve the efficiency as shown in FIG. 9.

For example, FIG. 17 shows the measurement of efficiency for low input voltages. The converter achieves a peak efficiency of 84% at an input voltage of 0.4V. It is able to harvest at input voltages as low as 10 mV with an efficiency of 22%. For example, the efficiency of a known boost converter could be 48% at 20 mV, while some embodiments of the boost converter described herein achieve an efficiency of 53% at 20 mV.

FIG. 18 is a data plot showing example variation of peak inductor current with process from a Monte-Carlo simulation, according to an embodiment. The peak inductor current varies with process. This is compensated by trimming the timing capacitor $C_{LS}$ (e.g., 1015 in FIG. 10) in the design.

FIGS. 19-20 provide data plot diagrams showing example measured zero-detection scheme showing optimal zero detection for ratio up to 47 times. The optimal zero detection helps in achieving higher frequency. The behavior of the node $V_X$ during switching indicates the performance of zero detection. If the switch $M_{HS}$ is opened before or after inductor current goes to zero, the output at the node $V_X$ will over-shoot or undershoot. For example, suppose inductor was still carrying current when $M_{HS}$ was opened. As a result the low impedance of the switch is replaced by the high impedance of the diode. Therefore, the drop between $V_X$ and $V_{CAP}$ increases. Therefore, the $V_X$ node overshoots. Similarly, if the switch is turned on for longer time and the current crosses zero and changes the direction and starts removing charge from the $V_{CAP}$ voltage, then the $V_X$ node will undershoot. Absence of overshoot or undershoot upon opening the switch is the indication of substantially optimal zero detection.

FIG. 20 shows the example measured zero detection for various combinations of $V_{IN}$ and $V_{CAP}$. Node of $V_X$ in all the waveforms does not overshoot or undershoot, indicating substantially ideal zero detection.

FIG. 21 is a data plot diagram showing example measured operation of the boost converter with selected input voltages, e.g., from an input voltage 1202 of 10 mV and 8 mV. In this set-up the $V_{CAP}$ was broken into two rails, one supplying the switch control circuit and another as the output of boost converter. $V_{CAP}$ 1201 supplying circuit was initially pre-charged to higher voltage. FIG. 21 shows that the output can charge from $V_{IN}$ of as low as 10V (1202).

FIG. 22 is a data plot diagram showing example measurements of kick-start of the boost converter, according to an embodiment. The figure shows the waveform for kick-start at 2201-2202. In this set-up $V_{CAP}$ is initially charged to 590 mV (e.g., at 2201) and then left to charge from boost converter. The boost converter charges the rail from 590 mV to 1V at 2202.

FIGS. 23-26 provide example embodiments of a TEG, according to an embodiment. A thermoelectric generator (TEG) converts the thermal energy arising from the difference in temperature into electrical energy and vice-versa. The physics behind the thermoelectric phenomenon known as the Seebeck effect, which is production of an electromotive force (emf) and consequently voltage or current between two dissimilar conductors when their junctions are maintained at different temperatures. The conductors 2305 (can be metals or semiconductors and need not be solid. Apart from generation of emf, thermoelectrics are also used for measuring temperature as well as for heating or cooling. When electricity is passed through the junction of two different conducting materials, either heat can be generated or taken away (cooling). This effect is called the Peltier effect. Similarly, if temperature difference exists between two metals, the amount of electromotive force generated is proportional to the difference of temperature. By measuring the produced voltage or current the temperature can be measured.

The thermoelectric materials used for generating electricity need to be good conductor of electricity as scattering effect can generate heat on both sides of the barrier. Also, the thermoelectric materials should be poor conductor of heat, otherwise the temperature difference maintained between the hot side and cold sides produces large heat backflow. Materials that optimize these electrical and thermal properties fit the bill. The highest performance has been shown by heavily doped semiconductors, like bismuth-telluride or silicon-germanium. The semi-conductor material also forms a base on which both n-type (2302) and p-type (2301) semiconductor can be generated. Segments of p-type 2301—and n-type-doped semiconductor materials 2302, such as suitably doped bismuth telluride, are connected together to form an electric circuit. The shunts are made of an excellent electrical conductor, such as copper. A voltage drives a current through the circuit, passing from one segment to another through the connecting shunts. For determining efficiency, this configuration is equivalent to the electrons passing directly from one thermoelectric material to the other. For example, thermoelectric cooling/heating modules can be constructed of thermoelectric segments repeated many times, and organized into art like the one shown at 2304. When current flows within the module, one side is cooled (2304a) and the other is heated (2304b). If the current is reversed, the hot and cold sides reverse also. The geometry for power generators is conceptually the same. In this case, the top side is connected to a heat source and the bottom to a heat sink. Thermoelectric power generators often are similar in physical form to cooling modules except that fewer taller and thicker elements are used.

The Seebeck effect in the semiconductor material produces a flow of excess electrons from the hot junction in the n-type, material 2302 to the cold junction. In the p-type material 2301, holes migrate toward the cold side producing a net current flow that is in the same direction as that of the n-type material 2302. The measure of the performance of the material used in TEG is the Seebeck coefficient is defined as the change in voltage per degree of temperature change.

$$S = \frac{dV}{dT}$$

Because heat flows from the top to the bottom, all of the thermoelectric legs are thermally connected in parallel. In the power-generation mode, heat flowing from the top to the bottom drives an electric current through an external load. The voltage obtained at the output of the thermal harvester is proportional to the temperature difference across the thermoelectric element. For body worn devices, the temperature difference is very small and an output voltage of few mV-50 mV is all that can be produced using a 10 cm² thermal harvester. The energy harvester should be able to harvest energy from such low input voltages. A TEG harvester that can harvest from an output voltage of 10 mV as discussed above can be used.

The thermoelectric generator can be modelled as a voltage source in series with an input resistance. For example, FIG. 24 shows the equivalent circuit of a TEG. The open circuit voltage $V_{TEG}$ 2401 is directly proportional to the temperature difference between hot and the cold side and is given by, $$V_{TEG} = S\Delta T$$

where S is Seebeck coefficient and ΔT is the temperature difference between the hot and cold side of TEG. Commercial TEGs can use semiconductor material bismuth telluride owing to its good electrical conductivity and poor thermal conductivity. The Seebeck coefficient of an n-type bismuth telluride material is −287 µV/K at 54° C. Because of the lower voltage coming out of one TEG cell, multiple cells can be used in series to increase the output voltage as shown in FIG. 23 (e.g., 2301-2302). Connecting more cells in series increases the input resistance of the TEG and can reduce the efficiency. Also, smaller size TEG can be used for body worn devices. Therefore, the output voltage of the TEG can be very small, at times few mV only. The circuit proposed in this application (e.g., FIG. 1) can harvest energy from such low output voltages in TEG material.

FIG. 25 shows a circuit having an energy harvester connected to the TEG. The harvester 2502 will present a load with an output impedance $Z_{LOAD}$ 2501 to the TEG. The power drawn from TEG is dependent on the value of the $Z_{LOAD}$. When $Z_{LOAD}$ 2501 is very high the current drawn by the harvester 2502 will be very small and so the output power will be small. Similarly, if the $Z_{LOAD}$ 2501 is low, the output voltage will be small and consequently the output power will be small. The maximum power will be delivered to the load when $Z_{LOAD}$ (2501)=$R_{in}$ (2504), e.g., at 2503.

FIG. 26 shows the output characteristics of an energy harvester connected to TEG. It shows the output power and output voltage as a function of load current. The output power peaks and a maximum power point 2601 exists for the load. The maximum power point 2601 happens when the load matches the input resistance $R_{in}$, e.g., at 2503 in FIG. 25. At this operating condition the output voltage $V_{in}$ 2506 in FIG. 25 is given as $V_{in}$ (2506)=$V_{TEG}/2$, where $V_{TEG}$ is shown at 2507 in FIG. 25.

The ambient condition in which a thermoelectric generator operates is dynamic. For example, the temperature difference between the hot side and cold side in a TEG can change. This can lead to change in the open circuit voltage of the TEG. As a result, the maximum power point (MPP) of a TEG is a dynamic quantity and it changes with time. The energy harvester can continuously or repeatedly track and operate at the maximum power point to substantially maximize the harvested energy. For example, in FIG. 6, the maximum power point circuit that continuously or repeatedly tracks and operates the energy harvester at the MPP point.

It is possible that some of the methods and apparatus described herein can be performed by software (stored in memory and executed on hardware), hardware, or a combination thereof. For example, the control circuits discussed above can alternatively be control modules or control devices implemented in or including such software and/or hardware. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, JAVA™, Ruby, Visual Basic™, and other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. Additional examples of computer code include, but are not limited to, control signals, encrypted code, and compressed code.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

While various embodiments have been described above, it should be understood that they have been presented by way of example only, and not limitation. Where methods and steps described above indicate certain events occurring, in certain order, the ordering of certain steps may be modified. Additionally, certain steps may be performed concurrently in a parallel process when possible, as well as performed sequentially as described above. Although various embodiments have been described as having particular features and/or combinations of components, other embodiments are possible having any combination or sub-combination of any features and/or components from any of the embodiments described herein.

What is claimed is:

1. A method, comprising:
    receiving and sampling an input voltage;
    generating a control signal having an amplitude proportional to the square of a magnitude of the input voltage and having a pulse duration proportional to an inverse of the magnitude of the input voltage; and
    sending the control signal to a boost converter switch to activate a boost converter such that the boost converter generates an inductor current proportional to the square of the input voltage, a peak inductor current being substantially first-order independent of the input voltage.

2. The method of claim 1, further comprising:
    generating an output voltage when the boost converter switch is activated.

3. The method of claim 1, wherein the peak inductor current is substantially first-order independent of an output voltage generated by the boost converter, the peak inductor current remains substantially constant when the boost converter switch is activated.

4. The method of claim 1, wherein the control signal is a first control signal, the method further comprising:
    generating a second control signal that is configured to deactivate a high switch of the boost converter switch when the inductor current is detected to be zero.

5. The method of claim 1, wherein the control signal is a first control signal, the method further comprising:
    generating a second control signal configured to offset compensation in comparators of the boost converter when the peak inductor current is kept substantially constant.

6. The method of claim 1, wherein the sending the control signal includes sending the control signal such that the boost converter repeatedly activates and deactivates the control signal according to the pulse duration of the control signal for power savings.

7. The method of claim 1, further comprising:
    receiving the input voltage from an energy harvesting component; and
    tracking a maximum power point of the energy harvesting component to operate the boost converter switch at the maximum power point.

8. The method of claim 1, further comprising:
    receiving the input voltage from an energy harvesting component; and
    tracking a maximum power point of the energy harvesting component to operate the boost converter switch at the maximum power point, the energy harvesting component including a thermoelectric generator and/or a photovoltaic cell.

9. The method of claim 1, wherein the control signal is a first control signal, the method further comprising:
    generating a second control signal configured to offset compensation in comparators of the boost converter when the peak inductor current is kept substantially constant, the second control signal having a pulse width set by a delay line in the boost converter, a control circuit and/or a clock generator.

10. A method, comprising:
    receiving and sampling an input voltage;
    generating a control signal based on the input voltage, the control signal having an amplitude substantially proportional to the square of a magnitude of the input voltage and having a pulse duration substantially proportional to an inverse of the magnitude of the input voltage;
    sending the control signal to a boost converter switch to activate a boost converter configured to generate an inductor current of an inductor; and
    varying an activation time of the boost converter switch based on the input voltage to maintain a peak inductor current of the inductor substantially constant during the activation of the boost converter switch.

11. The method of claim 10, further comprising:
    generating an output voltage when the boost converter switch is activated.

12. The method of claim 10, wherein the peak inductor current is substantially independent of the input voltage and/or an output voltage of the boost converter.

13. The method of claim 10, wherein the control signal has an amplitude proportional to a square of a magnitude of the input voltage, the control signal has a pulse duration proportional to an inverse of the magnitude of the input voltage.

14. The method of claim 10, wherein the control signal is a first control signal, the method further comprising:
    generating a second control signal that is configured to deactivate a high switch of the boost converter switch when the inductor current is detected to be zero.

15. The method of claim 10, wherein the control signal is a first control signal, the method further comprising:
    generating a second control signal configured to offset compensation in comparators of the boost converter when the peak inductor current is maintained substantially constant.

16. The method of claim 10, wherein the control signal is a first control signal, the method further comprising:
    generating a second control signal configured to offset compensation in comparators of the boost converter when the peak inductor current is maintained substantially constant, the second control signal having a pulse width set by a delay line in the boost converter, a control circuit of the boost converter and/or a clock generator of the boost converter.

17. The method of claim 10, wherein the boost converter repeatedly activates and deactivates the control signal according to a pulse duration of the control signal for power savings.

18. The method of claim 10, further comprising:
    receiving the input voltage from an energy harvesting component; and
    tracking a maximum power point of the energy harvesting component to operate the boost converter switch at the maximum power point.

19. The method of claim 10, further comprising:
receiving the input voltage from an energy harvesting component; and
tracking a maximum power point of the energy harvesting component to operate the boost converter switch at the maximum power point, the energy harvesting component including a thermoelectric generator and/or a photovoltaic cell.

20. An apparatus, comprising:
an inductor configured to pass through an inductor current;
a boost converter switch operatively coupled to the inductor, configured to receive a control signal to activate a boost converter to generate the inductor current; and
a switch control circuit operatively coupled to the boost converter switch, the switch control circuit configured to:
  receive an input voltage and generate a control signal having an amplitude proportional to the square of a magnitude of the input voltage and having a pulse duration proportional to an inverse of the magnitude of the input voltage, and
  vary an activation time of the boost converter switch based on the input voltage to maintain a peak inductor current of the inductor substantially constant.

* * * * *